(12) United States Patent
Huang et al.

(10) Patent No.: US 12,432,705 B2
(45) Date of Patent: Sep. 30, 2025

(54) COMMUNICATION APPARATUSES AND COMMUNICATION METHODS FOR RANDOM ACCESS

(71) Applicant: Panasonic Intellectual Property Corporation of America, Torrance, CA (US)

(72) Inventors: Lei Huang, Singapore (SG); Hidetoshi Suzuki, Kanagawa (JP); Tien Ming Benjamin Koh, Singapore (SG); Yang Kang, Singapore (SG)

(73) Assignee: Panasonic Intellectual Property Corporation of America, Torrance, CA (US)

(*) Notice: Subject to any disclaimer, the term of this patent is extended or adjusted under 35 U.S.C. 154(b) by 596 days.

(21) Appl. No.: 17/257,072

(22) PCT Filed: Jul. 16, 2019

(86) PCT No.: PCT/SG2019/050345
§ 371 (c)(1),
(2) Date: Dec. 30, 2020

(87) PCT Pub. No.: WO2020/085996
PCT Pub. Date: Apr. 30, 2020

(65) Prior Publication Data
US 2021/0127429 A1    Apr. 29, 2021

(30) Foreign Application Priority Data

Oct. 23, 2018    (SG) .......................... 10201809360V

(51) Int. Cl.
*H04W 74/0833*    (2024.01)
*H04W 72/0453*    (2023.01)
(Continued)

(52) U.S. Cl.
CPC ... *H04W 74/0833* (2013.01); *H04W 72/0453* (2013.01); *H04W 74/004* (2013.01); *H04W 74/0891* (2013.01)

(58) Field of Classification Search
CPC ......... H04W 74/0833; H04W 72/0453; H04W 74/004; H04W 74/0891; H04W 74/0808; H04W 72/0446; H04W 72/53
See application file for complete search history.

(56) References Cited

U.S. PATENT DOCUMENTS

2015/0156760 A1* 6/2015 Yu .......................... H04W 4/70
370/329
2017/0013469 A1* 1/2017 Larsson ............ H04W 74/0891
(Continued)

FOREIGN PATENT DOCUMENTS

CN     108684077 A    10/2018
EP     3496502 A1    12/2019
(Continued)

OTHER PUBLICATIONS

Samsung "Initial Access and Mobility Procedure for NR-U", 3GPP R1-1810861, Oct. 8-12, 2018 (Year: 2018).*
(Continued)

*Primary Examiner* — Chuong M Nguyen
(74) *Attorney, Agent, or Firm* — Seed Intellectual Property Law Group LLP

(57) ABSTRACT

The present disclosure provides apparatuses and methods for establishing a random access. The apparatuses include a terminal which comprises circuitry which, in operation, generates a first random access preamble; and a transmitter which, in operation, transmits the first random access preamble to a base station on a first physical random access channel (PRACH) occasion (RO) among a plurality of RO candidates, the plurality of RO candidates being determined based on PRACH configuration information received from (Continued)

the base station, wherein the first RO is assigned within a first frequency region, the first frequency region being equal to a first sub-band in which a listen before talk (LBT) procedure is performed at the terminal.

20 Claims, 11 Drawing Sheets

(51) Int. Cl.
  *H04W 74/00* (2009.01)
  *H04W 74/08* (2024.01)

(56) References Cited

U.S. PATENT DOCUMENTS

| | | | |
|---|---|---|---|
| 2019/0132882 A1 | 5/2019 | Li et al. | |
| 2019/0387546 A1* | 12/2019 | Li | H04L 27/26025 |
| 2019/0387547 A1* | 12/2019 | Shin | H04W 48/12 |
| 2020/0008188 A1* | 1/2020 | Nam | H04W 74/02 |
| 2020/0053779 A1* | 2/2020 | Jeon | H04W 74/02 |
| 2021/0307061 A1* | 9/2021 | Huang | H04W 74/0808 |
| 2021/0307068 A1* | 9/2021 | Kim | H04W 74/0816 |

FOREIGN PATENT DOCUMENTS

| | | |
|---|---|---|
| WO | 2018/026182 A1 | 2/2018 |
| WO | 2019/240549 A1 | 12/2019 |

OTHER PUBLICATIONS

Intel "Random access procedure for NR-u", 3GPP R2-1813987, Aug. 20-24, 2018 (Year: 2018).*
Motorola "Initial Access and Diversity in RACH transmissions", 3GPP R1-1811055, Oct. 8-12, 2018 (Year: 2018).*
International Search Report, mailed Oct. 4, 2019, for corresponding International Application PCT/SG2019/050345, 3 pages.
Motorola Mobility, Lenovo, "Initial Access and Diversity in RACH transmissions," R1-1811055, Agenda Item: 7.2.2.4.2, 3GPP TSG RAN WG1 Meeting 94bis, Chengdu, China, Oct. 8-12, 2018, 4 pages.
Extended European Search Report, dated Dec. 2, 2021, for European Application No. 19876383.1-1215, 15 pages.
Samsung, "Initial Access and Mobility Procedure for NR-U," R1-1808769, Agenda Item: 7.2.2.4.2, 3GPP TSG RAN WG1 Meeting #94, Gothenburg, Sweden, Aug. 20-24, 2018, 8 pages.
Nokia, Nokia Shanghai Bell, "On Initial Access and Mobility for NR-U," R1-1810624, Agenda Item: 7.2.2.4.2, 3GPP TSG RAN WG1 Meeting #94bis, Chengdu, China, Oct. 8-12, 2018, 9 pages.
Samsung, "Initial Access and Mobility Procedure for NR-U," R1-1810861, Agenda Item: 7.2.2.4.2, 3GPP TSG RAN WG1 Meeting #94bis, Chengdu, China, Oct. 8-12, 2018, 8 pages.
Spreadtrum Communications, "Random Access Procedure in NR-U," R2-1813874, Agenda Item: 11.2.1.1, 3GPP TSG-RAN WG2 Meeting #103bis, Chengdu, China, Oct. 8-12, 2018, 5 pages.
Intel Corporation, "Random access procedure for NR-u," R2-1813987, Agenda Item: 11.2.1.1, 3GPP TSG-RAN WG2 meeting #103bis, Gothenburg, Sweden, Aug. 20-24, 2018, 6 pages.
3GPP TS 38.213 V15.3.0, "3rd Generation Partnership Project; Technical Specification Group Radio Access Network; NR; Physical layer procedures for control (Release 15)," Sep. 2018, 6 pages.
3GPP TS 38.211 V15.3.0, "3rd Generation Partnership Project; Technical Specification Group Radio Access Network; NR; Physical channels and modulation (Release 15)," Sep. 2018, 22 pages.
LG Electronics, "Initial access and mobility for NR unlicensed operation", R1-1810270, Agenda Item: 7.2.2.4.2, 3GPP TSG WG1 Meeting #94bis, Chengdu, China, Oct. 2018, 15 pages.
3GPP TS 38.331 v15.3.0, "3rd Generation Partnership Project; Technical Specification Group Radio Access Network; NR; Radio Resource Control (RRC) protocol specification (Release 15)," Sep. 2018, 4 pages.
China Telecom, "Further discussion on BS test applicability for different SCSes and CHBWs," R4-1809660, Agenda Item: 7.13.2.1, 3GPP TSG-RAN WG4 Meeting #88, Gothenburg, SE, Aug. 20-24, 2018, 4 pages.
Vivo, "Discussion on initial access for NR-U," R1-1810383, Agenda Item: 7.2.2.4.2, 3GPP TSG RAN WG1 Meeting #94bis, Chengdu, China, Oct. 8-12, 2018, 6 pages.
CATT, "Remaining issues of NR PRACH procedure," R1-1810514, Agenda Item: 7.1.1.2, 3GPP TSG RAN WG1 Meeting #94bis, Chengdu, China, Oct. 8-12, 2018. (6 pages).

* cited by examiner

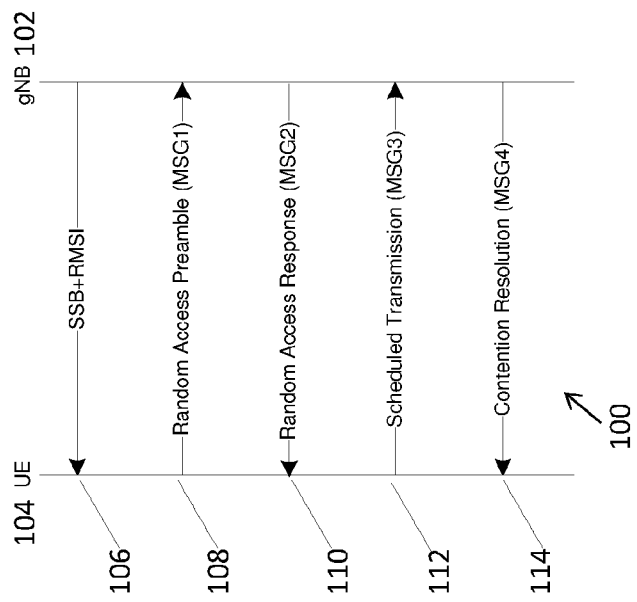

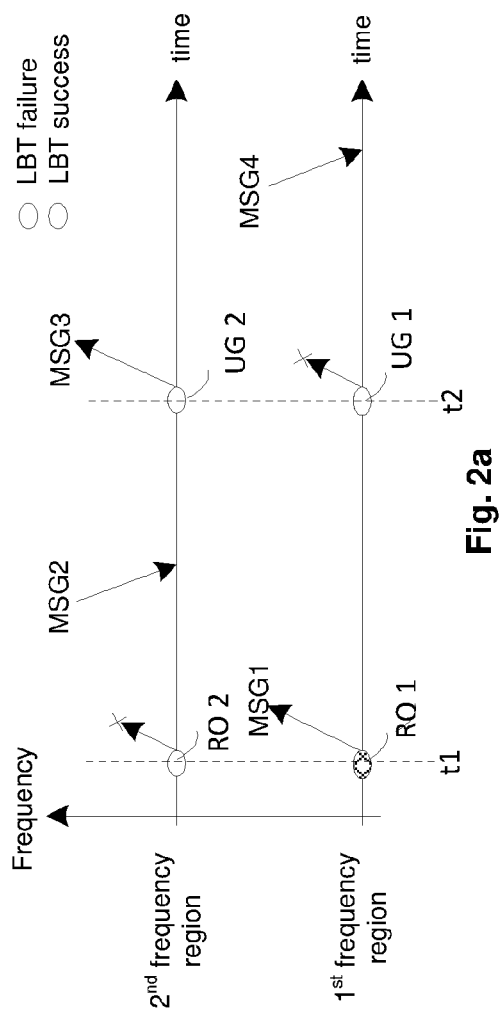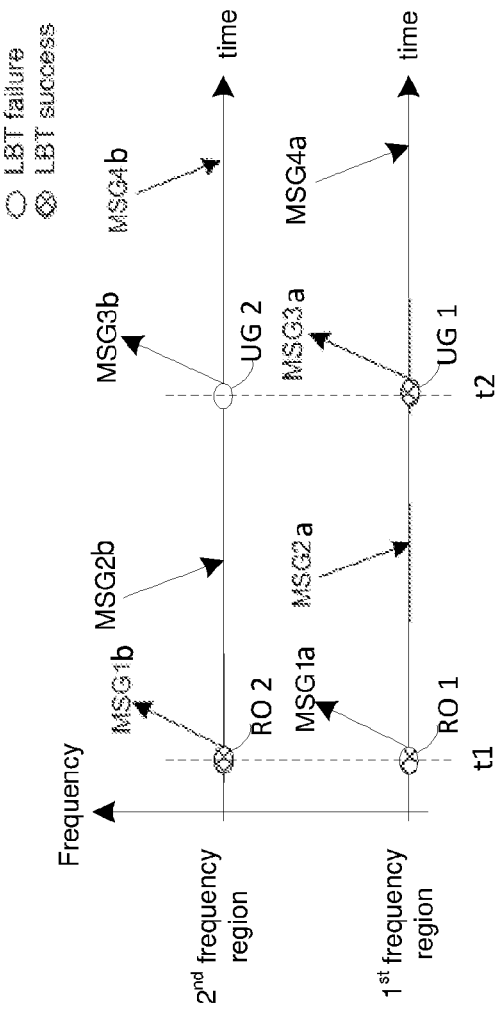
Fig. 2a
Fig. 2b

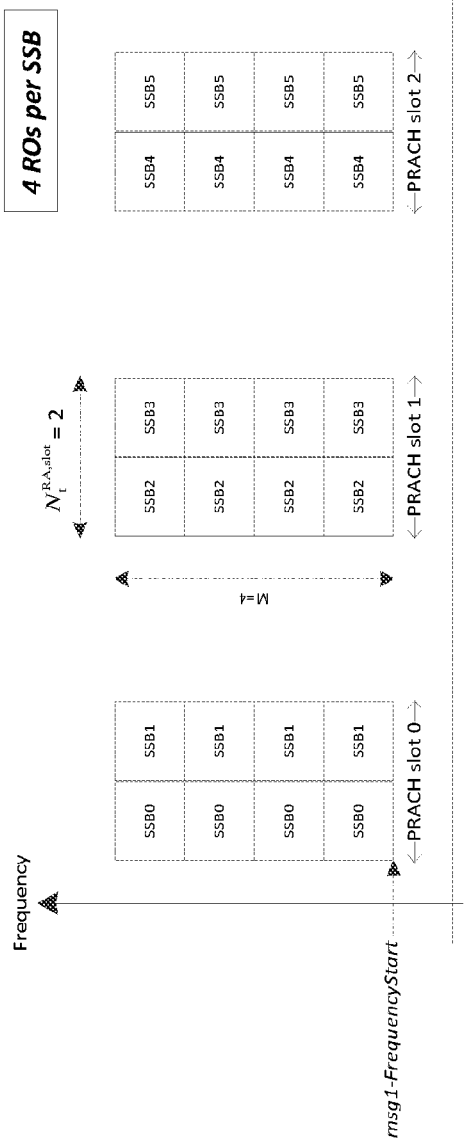
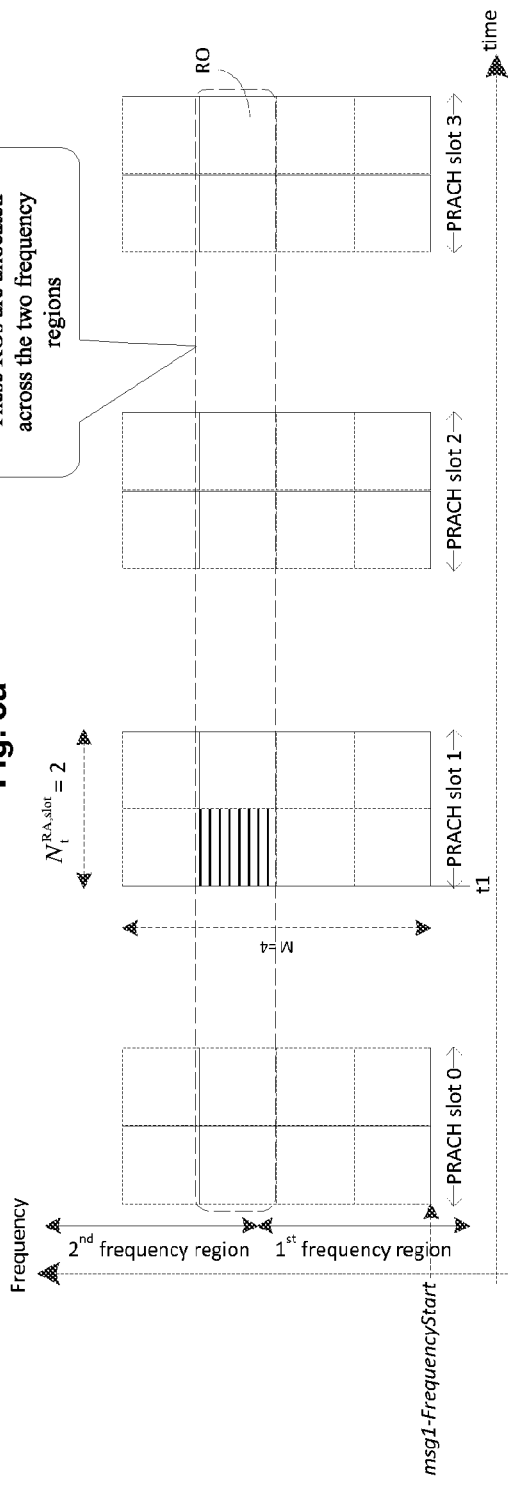
Fig. 3a
Fig. 3b

COMMUNICATION APPARATUSES AND COMMUNICATION METHODS FOR RANDOM ACCESS

TECHNICAL FIELD

The following disclosure relates to communication apparatuses and communication methods for random access in $5^{th}$ generation (5G) communications, and more particularly to communication apparatuses and communication methods for establishing a random access channel (RACH) procedure in new radio (NR) operating in unlicensed bands.

BACKGROUND

In the standardization of 5G, a NR access technology that not necessarily has backward compatibility with long term evolution (LTE)/LTE-Advanced technologies has been discussed in the $3^{rd}$ generation partnership project (3GPP). In NR, as with LTE license-assisted access (LTE-LAA), operations in unlicensed bands (e.g. NR-U) are expected.

In unlicensed bands, a listen before talk (LBT) procedure is required for channel access, depending on the country, frequency and conditions. However, there has been no sufficient discussion on communication apparatuses and communication methods for establishing a RACH procedure in unlicensed bands subject to LBT.

There is thus a need for communication apparatuses and methods that can solve the above mentioned drawbacks to ensure efficient and reliable communication for establishing a RACH procedure in NR operating in unlicensed bands. Furthermore, other desirable features and characteristics will become apparent from the subsequent detailed description and the appended claims, taken in conjunction with the accompanying drawings and this background of the disclosure.

SUMMARY

One non-limiting and exemplary embodiment facilitates establishing a random access channel (RACH) procedure in an efficient and reliable manner.

In one aspect, the techniques disclosed herein provide a communication apparatus. The communication apparatus is a terminal. The terminal comprises circuitry which, in operation, generates a first random access preamble; and a transmitter which, in operation, transmits the first random access preamble to a base station on a first physical random access channel (PRACH) occasion (RO) among a plurality of RO candidates. The plurality of RO candidates are determined based on PRACH configuration information received from the base station. In the aspect, the first RO is assigned within a first frequency region, the first frequency region being equal to a first sub-band in which a listen before talk (LBT) procedure is performed at the terminal.

In another aspect, the techniques disclosed herein provide a communication apparatus. The communication apparatus is a base station. The base station comprises circuitry which, in operation, determines PRACH configuration, the PRACH configuration including a plurality of RO candidates; and a receiver which, in operation, receives a first random access preamble from a terminal on a first RO among the plurality of RO candidates. In this aspect, the first RO is assigned within a first frequency region, the first frequency region being equal to a first sub-band in which a LBT procedure is performed at the terminal.

In another aspect, the techniques disclosed herein provide a communication method. The communication method comprises generating, at a terminal, a first random access preamble; and transmitting, from the terminal, the first random access preamble to a base station on a first RO among a plurality of RO candidates, the plurality of RO candidates being determined based on PRACH configuration information received from the base station, wherein the first RO is assigned within a first frequency region, the first frequency region being equal to a first sub-band in which a LBT procedure is performed at the terminal.

In yet another aspect, the techniques disclosed herein provide another communication method. The communication method comprises determining, at a base station, PRACH configuration, the PRACH configuration including a plurality of RO candidates; and receiving, at the base station, a first random access preamble on a first RO among the plurality of RO candidates, wherein the first RO is assigned within a first frequency region, the first frequency region being equal to a sub-band in which a LBT procedure is performed at the terminal.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 1 shows a signal flow in accordance with an exemplary method 100 including a four-step random access channel (RACH) procedure between a base station and a terminal.

FIG. 2a shows an example of physical random access channel (PRACH) occasions (ROs) defined in time and frequency domains and used for MSG1 transmission within a 4-step RACH procedure in an unlicensed carrier having more than one frequency regions. In this example, the ROs are distributed in the more than one frequency regions and used for establishing a single RACH procedure (interchangeably referred to as a single-RACH procedure).

FIG. 2b shows another example of ROs defined in time and frequency domains and used for MSG1 transmission within a 4-step RACH procedure in an unlicensed carrier having more than one frequency regions. In this example, the ROs are distributed in the more than one frequency regions and used for establishing multiple RACH procedures in parallel (interchangeably referred to as a multiple-RACH procedure).

FIG. 3a shows an example of PRACH configuration in a licensed carrier according to the NR technology. As shown in the example, the PRACH is configured per carrier.

FIG. 3b shows a scenario in which ROs are underutilized when the PRACH configuration according to the NR technology shown in FIG. 3a is used in an unlicensed carrier.

Figure 4B:
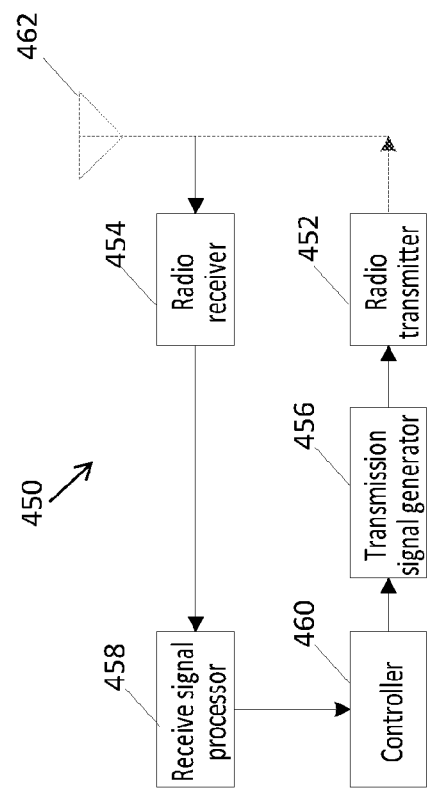
FIG. 4b shows a schematic example of terminal for establishing a RACH procedure in accordance with embodiments. In the example, the terminal may be interchangeably referred to as a user equipment.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to a base station and a terminal for establishing a RACH procedure in a 5G NR communication system. The 5G NR communication system may be a NR stand-alone system. A NR stand-alone system can operate in a licensed carrier, in an unlicensed carrier, or in both a licensed carrier and an unlicensed carrier. The RACH procedure is triggered by events such as an initial access procedure from a user equipment (interchangeably referred to as a UE, or a terminal) at a state in which the terminal is switched on but does not have any established radio resource control (RRC) connection (i.e. RRC_IDLE), a RRC connection re-establishment procedure, a handover procedure, a beam failure recovery, etc. The RACH procedure is either contention based or contention free. The contention based RACH procedure may be a four-step RACH procedure or a two-step RACH procedure. The contention free RACH procedure is basically a two-step procedure.

FIG. 1 depicts a signal flow in accordance with an exemplary method 100 including a four-step RACH procedure between a base station 102 and a terminal 104.

In the exemplary method 100 of FIG. 1, the base station 102 is a ngNodeB (gNB). It can be appreciated by those skilled in the art that the base station 102 can also be a ng-eNB, which is a node providing Evolved Universal Mobile Telecommunications System (UMTS) Terrestrial Radio Access (E-UTRA) user plane and control plane protocol terminations towards the terminal, and connected via the NG interface to the 5GC.

As shown in FIG. 1, at step 106, the base station 102 periodically transmits synchronization signal blocks (SSBs) and remaining minimum system information (RMSI) to the terminal 104. The RMSI includes information of PRACH configuration (interchangeably referred to as PRACH configuration information) that is determined by the base station 102. The PRACH configuration includes time and frequency resources that define respective ROs in time and frequency domains for terminals that are communicable with the base station 102, including the terminal 104, to establish respective RACH procedures with the base station 102. Each of the SSBs transmitted from the base station 102 to the terminal 104 is associated with one or more ROs. Accordingly, at step 106, the terminal 104 receives the SSBs and the RMSI from the base station 102.

At step 108, the terminal 104 transmits a random access preamble (interchangeably referred to as a PRACH preamble, shown as MSG1) on a RO to the base station 102. The RO is associated with one SSB that is selected/detected by the terminal 104 for having a good quality among the SSBs transmitted at step 106. In an embodiment, another terminal may accidentally transmit the same PRACH preamble on the RO or another RO associated with the same SSB as the RO (shown at step 108). Accordingly, at step 108, the base station 102 receives the MSG1 on the RO from the terminal 104. The base station 102 may also receive the same MSG1 on the RO or another RO associated with the same SSB with the RO from another terminal.

At step 110, the base station 102 is configured to transmit a random access response (shown as MSG2) during a random access response (RAR) window in response to the receipt of the PRACH preamble(s) from the terminal 104 and/or another terminal. The configuration of the RAR window is determined by the base station and is included in system information. The MSG2 includes an index of a PRACH preamble received by the base station 102, a timing advance command and an uplink grant for a scheduled transmission (shown as MSG3). Accordingly, at step 110, the terminal 104 is further configured to receive the MSG2 during the RAR window in response to the transmission of the MSG1 to the base station 102.

At step 112, if the index of the PRACH preamble transmitted by the terminal 104 at step 108 is matched to the index of the PRACH preamble received by the base station 102 in the MSG2, the terminal 104 is further configured to transmit a MSG3 at the uplink grant to the base station 102 in response to the receipt of the MSG2 from the base station 102. Otherwise the terminal 104 determines the RACH procedure between the terminal 104 and the base station 102 is unsuccessful and may restart another RACH procedure. The MSG3 includes an identifier of the terminal 104. In an embodiment, another terminal with the index of the transmitted PRACH preamble that is matched to the index of the PRACH preamble in the MSG2 may also transmit a MSG3 at the uplink grant to the base station 102. Accordingly, at step 112, the base station 102 is configured to receive the MSG3(s) at the uplink grant from the terminal 104 and/or another terminal in response to the MSG2 transmission.

At step 114, the base station 102 is configured to transmit a contention resolution (shown as MSG4) in response to the receipt of the MSG3(s) from the terminal 104 and/or another terminal. The MSG4 includes an identifier of a terminal who has won the contention. Accordingly, at step 114, the terminal 104 is configured to receive the MSG4 from the base station 102 in response to the transmission of the MSG3 to the base station 102. If the identifier of the terminal 104 is matched to the identifier of the winning terminal in the MSG4, the terminal 104 determines the RACH procedure between the terminal 104 and the base station 102 is successful. Otherwise the terminal 104 determines the RACH procedure between the terminal 104 and the base station 102 is unsuccessful and may restart another RACH procedure.

The above described steps 108, 110, 112 and 114 of the exemplary method 100 form a 4-step RACH procedure. As shown in FIG. 1, before the 4-step RACH procedure, the ROs are determined by the base station 102 and informed to the terminal 104 in the PRACH configuration information transmitted within the RMSI at step 106.

According to the present disclosure, when the 5G NR communication system operates in an unlicensed carrier, the carrier may have a bandwidth of multiple of 20 MHz. The frequency range of the carrier can be divided into one or more frequency regions. Each frequency region equals to a frequency sub-band in which a LBT procedure is performed (interchangeably referred to as LBT sub-band). A frequency region or a LBT sub-band may have a size of 20 MHz.

In the 4-step RACH procedure as shown in FIG. 1, prior to the MSG1 or MSG3 transmission, the terminal 104 may need to perform a LBT procedure to determine whether the sub-band in which the MSG1 or MSG3 will be transmitted is idle. If the sub-band is considered to be idle (i.e. LBT success), the terminal 104 transmits the MSG1 or MSG3. If the sub-band is considered to be busy (i.e. LBT failure), the terminal 104 does not transmit the MSG1 or MSG3. Similarly, prior to the MSG2 or MSG4 transmission, the base station 102 may need to perform a LBT procedure as well. The reduced transmission opportunities of MSG1, MSG2, MSG3 and MSG4 due to LBT failures at the terminal 104 or the base station 102 would degrade efficiency of the 4-step RACH procedure. Consequently, it is necessary to develop mechanisms for increasing transmission opportunities of MSG1, MSG2, MSG3 and MSG4 against LBT failures in the 4-step RACH procedure. For example, to enhance transmission opportunities of MSG1 in case of the carrier comprising more than one frequency regions, at a time instant, there may have more than one ROs distributed in more than one frequency regions for PRACH preamble transmission. At this time instant, the terminal 104 may perform multiple LBT procedures simultaneously in multiple sub-bands. Even if one of the multiple LBT procedures fails, another of the multiple LBT procedures may succeed. In this manner, the transmission opportunities of MSG1 against LBT failures are multiplied.

The more than one ROs distributed in more than one frequency regions in a carrier may be utilized for transmitting a PRACH preamble to establish a single-RACH procedure or, alternatively, utilized for transmitting different PRACH preambles to establish a multiple-RACH procedure in the carrier.

FIG. 2a shows an example of ROs defined in time and frequency domains and used for MSG1 transmission within a 4-step RACH procedure in an unlicensed carrier having more than one frequency regions as shown in FIG. 1. In this example, the ROs are distributed in the more than one frequency regions and used for establishing a single-RACH procedure.

As shown in FIG. 2a, the frequency range of the carrier is divided into two frequency regions: a first frequency region and a second frequency region. It is appreciable that the number of frequency regions in the carrier depends on the carrier bandwidth and the size of LBT sub-band. For example, if the carrier has a bandwidth of 80 MHz and the LBT sub-band has a size of 20 MHz, there are four frequency regions in the carrier. If the carrier has a bandwidth of 80 MHz and the LBT sub-band has a size of 40 MHz, there are two frequency regions in the carrier.

In the example shown in FIG. 2a, at a time instant, two ROs are available for a terminal to perform PRACH preamble transmission. For example, at a time instant t1, two ROs, e.g. RO1 and RO2 that are respectively located in the first frequency region and the second frequency region, are available for the terminal to transmit a PRACH preamble to the base station.

In a single-RACH procedure, only a single PRACH preamble is transmitted. In this regard, the terminal selects RO1 and RO2 located in the first frequency region and the second frequency region that are both available for PRACH preamble transmission at the time instant t1, and performs a LBT procedure at each frequency region/sub-band. If the LBT procedure succeeds at both frequency regions, the terminal can randomly select one RO from RO1 and RO2, and transmit a PRACH preamble on this RO. In the example of FIG. 2a, the LBT procedure at the first frequency region is successful while the LBT procedure at the second frequency region fails. Therefore, the terminal transmits a PRACH preamble (i.e. MSG1) on RO1 to the base station.

After receipt of the PRACH preamble from the terminal, the base station returns a random access response (i.e. MSG2 shown in FIG. 1) during a RAR window in one of the two frequency regions with LBT success (e.g. the second frequency region as shown in FIG. 2a). The configuration of the RAR window is determined by the base station and indicated in system information so that the terminal is aware of the possible RAR window and be prepared to receive the random access response. The MSG2 may include more than one uplink grants for a scheduled transmission (i.e. MSG3) in the first frequency region, or the second frequency region, or both. In the example of FIG. 2b, the MSG2 includes an uplink grant UG1 in the first frequency region and an uplink grant UG2 in the second frequency region.

With the MSG2 received at the terminal, the terminal may perform a LBT procedure, at the time instant t2, at each frequency region/sub-band containing the uplink grants for MSG3 transmission. In the example of FIG. 2*a*, the LBT procedure at the second frequency region is successful while the LBT procedure at the first frequency region fails. Therefore, the terminal transmits the MSG3 on the uplink grant UG2 to the base station.

In response to the MSG3, the base station transmits a contention resolution (i.e. MSG4) at a downlink assignment in one of the two frequency regions with LBT success (e.g. the first frequency region as shown in FIG. 2*a*) to the terminal 104, so as to complete the 4-step RACH procedure. The downlink assignment is predetermined by the base station and indicated in the downlink control information (DCI) so that the terminal is aware of the possible downlink assignments and be prepared to receive the contention resolution.

FIG. 2*b* shows another example of ROs defined in time and frequency domains and used for MSG1 transmission within a 4-step RACH procedure in an unlicensed carrier having more than one frequency regions. In the example shown in FIG. 2*b*, the ROs are distributed in the more than one frequency regions and used for establishing a multiple-RACH procedure.

Similar to FIG. 2*a*, the frequency range of the carrier in FIG. 2*b* is divided into two frequency regions: the first frequency region and the second frequency region. It is appreciable that the number of frequency regions in the carrier depends on the carrier bandwidth and the size of LBT sub-band. For example, if the carrier has a bandwidth of 80 MHz and the LBT sub-band has a size of 20 MHz, there are four frequency regions in the carrier.

In the example of FIG. 2*b*, at a time instant, two ROs are available for a terminal to perform PRACH preamble transmission. For example, at a time instant t1, RO1 and RO2, which are respectively located in the first frequency region and the second frequency region, are available for the terminal to transmit different PRACH preambles to the base station for establishing multiple RACH procedures in parallel. It is appreciable that if the carrier has more frequency regions, the terminal may be able to transmit more PRACH preambles at a time instant.

In the multiple-RACH procedure in FIG. 2*b*, at the time instant t1, the terminal selects RO1 and RO2 located in the first frequency region and the second frequency region that are both available for PRACH preamble transmission, and performs a LBT procedure at each frequency region.

In the example of FIG. 2*b*, the LBT procedures at both frequency regions are both successful. Consequently, the terminal can transmit different PRACH preambles (i.e. MSG1a and MSG1b) respectively on RO1 and RO2 to the base station, so as to establish two parallel RACH procedures.

It is appreciable that a multiple-RACH procedure may still occur even though the LBT procedure may not be successful in all of the frequency regions. For example, if the carrier has more than two frequency regions (e.g. three frequency regions) and the LBT procedure succeeds in some (e.g. two) of the frequency regions, the terminal can transmit different PRACH preambles on ROs in the frequency regions with LBT success to establish the multiple-RACH procedure.

After receipt of the different PRACH preambles on RO1 and RO2 from the terminal, the base station returns two random access responses (i.e. MSG2a and MSG2b) during a RAR window in the first frequency region with LBT success or the second frequency region with LBT success. Alternatively, in case of LBT success in both frequency regions as shown in FIG. 2*b*, the base station returns the MSG2a and MSG2b respectively during a RAR window in each of both frequency regions. The configuration of the RAR windows is determined by the base station and indicated in system information so that the terminal is aware of the possible RAR windows and be prepared to receive the random access responses. The MSG2a in response to the MSG1a includes one or more uplink grants for a scheduled transmission MSG3a in the first frequency region, or the second frequency region, or both. The MSG2b in response to the MSG1b includes one or more uplink grants for a scheduled transmission MSG3b in the first frequency region, or the second frequency region, or both. In the example of FIG. 2*b*, the MSG2a includes an uplink grant UG1 for MSG3a transmission in the first frequency region while the MSG2b includes an uplink grant UG2 for MSG3b transmission in the second frequency region.

With the MSG2a and MSG2b received at the terminal, the terminal may perform a LBT procedure, at the time instant t2, at each frequency region/sub-band containing the uplink grants for MSG3a and MSG3b transmissions. In the example of FIG. 2*b*, the LBT procedures at both frequency regions are both successful. Therefore, the terminal transmits MSG3a and MSG3b respectively on UG1 and UG2 to the base station.

After receipt of the MSG3a and MSG3b from the terminal, the base station returns two contention resolutions (i.e. MSG4a and MSG4b) at a downlink assignment in the first frequency region with LBT success or the second frequency region with LBT success. Alternatively, in case of LBT success in both frequency regions, the base station returns the MSG4a and MSG4b respectively at a downlink assignment in each of both frequency regions. The downlink assignments are determined by the base station and indicated in DCI so that the terminal is aware of the possible downlink assignments and be prepared to receive the contention resolutions. In the example of FIG. 2*b*, the base station transmits the MSG4a at a downlink assignment in the first frequency region and the MSG4b at a downlink assignment in the second frequency region.

By dividing the frequency range of a carrier into multiple frequency regions, the ROs are distributed over different frequency regions in the carrier, which in turn substantially enhance transmission opportunities of MSG1 against LBT failures in a single-RACH procedure or a multiple-RACH procedure.

As described above, the ROs are determined by the base station in terms of time and frequency resources in the PRACH configuration for terminals to establish respective RACH procedures with the base station. As shown in FIG. 1, the information of the PRACH configuration (interchangeably referred to as PRACH configuration information) is transmitted in the RMSI from the base station to the terminal at step 102.

FIG. 3*a* shows an example of PRACH configuration in a licensed carrier according to the NR technology in which the PRACH is configured per carrier.

The time resources for the ROs are interchangeably referred to as PRACH time resources. In the RMSI, the PRACH time resources are indicated by a parameter according to higher layer protocols. For example, the parameter can be prach-ConfigurationIndex, which specifies preamble format, time positions of PRACH slots, the number of time-division multiplexed ROs within a PRACH slot (i.e. $N_t^{RA,slot}$), and the duration for each RO, etc. In the example of FIG. 3*a*, $N_t^{RA,slot}$ is 2, and the time positions of PRACH slots respectively indicates four PRACH slots in the PRACH configuration, i.e. PRACH slot 0, PRACH slot 1, PRACH slot 2, and PRACH slot 3.

The frequency resources for the ROs are interchangeably referred to as PRACH frequency resources. The PRACH frequency resources are indicative by a plurality of parameters. Each of frequency-division multiplexed ROs within one time instant has a frequency resource index $n_{RA}$, where $n_{RA} \in \{0, 1, \ldots, M-1\}$ and M equals a parameter msg1-FDM according to higher layer protocols. The starting position of ROs in a frequency domain is indicated by a parameter msg1-FrequencyStart according to higher layer protocols. The frequency-division multiplexed ROs within one time instant are numbered in an increasing order within an active uplink bandwidth part, starting from the lowest frequency.

A SSB to RO correspondence is shown in the PRACH configuration of FIG. 3a. The SSB to RO correspondence may be interchangeably referred to as SSB to RO association or SSB to RO mapping. The SSB to RO correspondence has a period that is dependent on the PRACH configuration period and the number of SSBs actually transmitted in the carrier.

If a parameter SSB-perRACH-Occasion according to higher layer protocols has a value that is smaller than one, one SSB is mapped to 1/SSB-perRACH-Occasion consecutive ROs. For example, as shown in FIG. 3a, the parameter SSB-perRACH-Occasion has a value of ¼. Accordingly, one SSB is mapped to 4 consecutive ROs in the example of FIG. 3a.

In the SSB to RO correspondence shown in FIG. 3a, SSB indexes are mapped to ROs in the following order:
(1) in an increasing order of frequency resource indexes for frequency division multiplexed ROs;
(2) in an increasing order of time resource indexes for time division multiplexed ROs within a PRACH slot; and
(3) in an increasing order of indexes for PRACH slots.

FIG. 3b shows a scenario in which ROs are underutilized when the PRACH configuration according to the NR technology as shown in FIG. 3a is used in an unlicensed carrier.

As described above, an unlicensed carrier may contain one or more frequency regions depending on the carrier bandwidth and the size of LBT sub-band. If the carrier has more than one frequency regions, some ROs may be allocated across two adjacent frequency regions in the carrier. If LBT failure occurs in one of the two adjacent frequency regions at a time instant, the RO that corresponds to the time instant and is allocated across the two adjacent frequency regions cannot be used for PRACH preamble transmission.

In the example of FIG. 3b, the carrier has two frequency regions, i.e. a first frequency region and a second frequency region. The ROs as circled out by the broken lines in FIG. 3b are allocated across the first frequency region and the second frequency region. If LBT fails in the first frequency region or the second frequency region at the time instant t1, the RO with a line fill pattern cannot be used.

In view of the above, it can be seen that technical problems may arise when the PRACH configuration according to the NR technology is used in an unlicensed carrier.

The present disclosure provides communication apparatuses and methods, as shown in the exemplified embodiments of FIGS. 4a, 4b, 5, 6, 7a to 7e, 8 and 9, that seek to enhance transmission opportunities of MSG1 against LBT failures in RACH procedures in an unlicensed carrier as shown in FIGS. 2a, 2b and 3b.

Figure 4A:
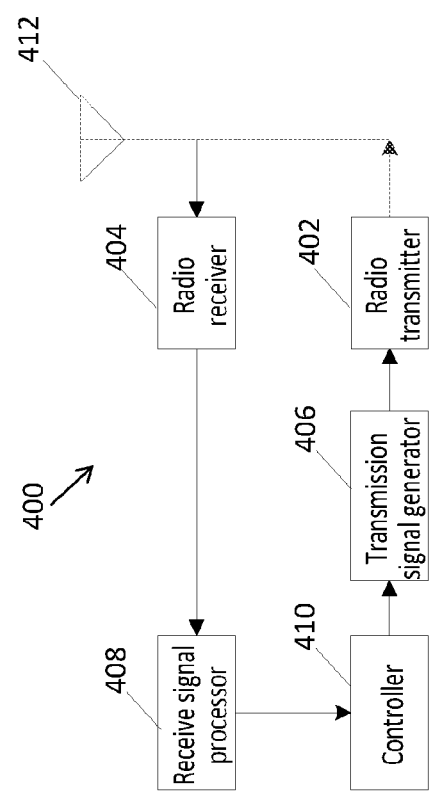
FIG. 4a shows a schematic example of base station for establishing a RACH procedure in accordance with embodiments. In the example, the base station may be interchangeably referred to as a ngNodeB (gNB).

FIG. 4a shows a schematic, partially sectioned view of a base station 400 that can be used for establishing a RACH procedure with a terminal in accordance with the present disclosure. Likewise, FIG. 4b shows a schematic, partially sectioned view of a terminal 450 that can be used for establishing a RACH procedure with the base station as shown in FIG. 4a, in accordance with the present disclosure.

Various functions and operations of the base station 400 and the terminal 450 are arranged into layers in accordance with a hierarchical model. In the model, lower layers report to higher layers and receive instructions therefrom in accordance with 3GPP 5G NR specifications. For the sake of simplicity, details of the hierarchical model are not discussed in the present disclosure.

As shown in FIG. 4a, the base station 400 is typically provided with at least one radio transmitter 402, at least one radio receiver 404, at least one transmission signal generator 406, at least one receive signal processor 408, at least one antenna 412 and at least one controller 410 for use in software and hardware aided execution of tasks it is designed to perform, including control of access to and communications with terminals such as the terminal 450 as shown in FIG. 4b. The data processing, storage and other relevant control apparatus can be provided on an appropriate circuit board and/or in chipsets. In various embodiments, when in operation, the at least one radio transmitter 402, at least one radio receiver 404, at least one transmission signal generator 406, at least one receive signal processor 408 and at least one antenna 412 may be controlled by the at least one controller 410.

Similarly, as shown in FIG. 4b, the terminal 450 is typically provided with at least one radio receiver 454, at least one radio transmitter 452, at least one transmission signal generator 456, at least one receive signal processor 458, at least one antenna 462 and at least one controller 460 for use in software and hardware aided execution of tasks it is designed to perform, including control of access to and communications via base stations such as the base station 400 as shown in FIG. 4a. The data processing, storage and other relevant control apparatus can be provided on an appropriate circuit board and/or in chipsets. In various embodiments, when in operation, the at least one radio transmitter 452, at least one radio receiver 454, at least one transmission signal generator 456, at least one receive signal processor 458, and at least one antenna 462 may be controlled by the at least one controller 460.

The at least one radio transmitter 402, at least one radio receiver 404, at least one transmission signal generator 406, at least one receive signal processor 408, and at least one controller 410 of the base station 400, and the at least one radio transmitter 452, at least one radio receiver 454, at least one transmission signal generator 456, at least one receive signal processor 458, and at least one controller 460 of the terminal 450, when in operation, provide functions required for establishing a RACH procedure between the terminal 450 and the base station 400 in accordance with embodiments of the present disclosure.

As described above with respect to FIG. 1, prior to a 4-step RACH procedure, the at least one radio transmitter 402 of the base station 400 transmits SSBs with RMSI including PRACH configuration information to the at least one radio receiver 454 of the terminal 450. Each of the SSBs is associated with a plurality of ROs.

In a single-RACH procedure, after receipt of the SSBs with RMSI from the base station, the controller 456 of the terminal 450 selects one SSB of a good quality among the SSBs and transmits a PRACH preamble as MSG1 on a RO associated with the selected/detected SSB to the at least one radio receiver 404 of the base station 400.

In a multiple-RACH procedure, after receipt of the SSBs with RMSI from the base station, the controller 456 of the terminal 450 selects one SSB of a good quality among the SSBs and transmits different PRACH preambles as multiple MSG1s on multiple ROs associated with the selected/detected SSB to the at least one radio receiver 404 of the base station 400.

Based on the PRACH configuration information included in the RMSI received from the base station 400, the controller 456 of the terminal 450 can determine a plurality of ROs associated with the selected/detected SSB. The plurality of ROs associated with the selected/detected SSB are considered as a plurality of RO candidates.

In the single-RACH procedure, the terminal 450 performs a LBT procedure on each frequency region containing the plurality of RO candidates, and selects a RO in a frequency region with LBT success among the plurality of RO candidates to establish the single-RACH procedure.

Similarly, in the multiple-RACH procedure, the terminal 450 performs a LBT procedure on each frequency region containing the plurality of RO candidates, and selects multiple ROs in one or more frequency regions with LBT success among the plurality of RO candidates to establish the multiple-RACH procedure.

As described above, the frequency range of a carrier may be divided into more than one frequency regions depending on the carrier bandwidth and the size of LBT sub-band. Accordingly, the plurality of RO candidates may be distributed in the more than one frequency regions.

As described above, not all the LBT procedures would be successful. Therefore, ROs in a frequency region with LBT failure cannot be used for PRACH preamble transmission. However, ROs in another frequency region with LBT success remain available in the plurality of RO candidates for the terminal 450 to select for transmitting the PRACH preamble. As a result, the transmission opportunities of MSG1 within a RACH procedure increase.

To achieve a more efficient RACH procedure, the present disclosure provides technical solutions to maximize RO availability in case of LBT failure in any frequency region. The technical solutions are exemplified in FIGS. 5, 6, 7a, 7b, 7c, 7d and 7e.

Figure 5:
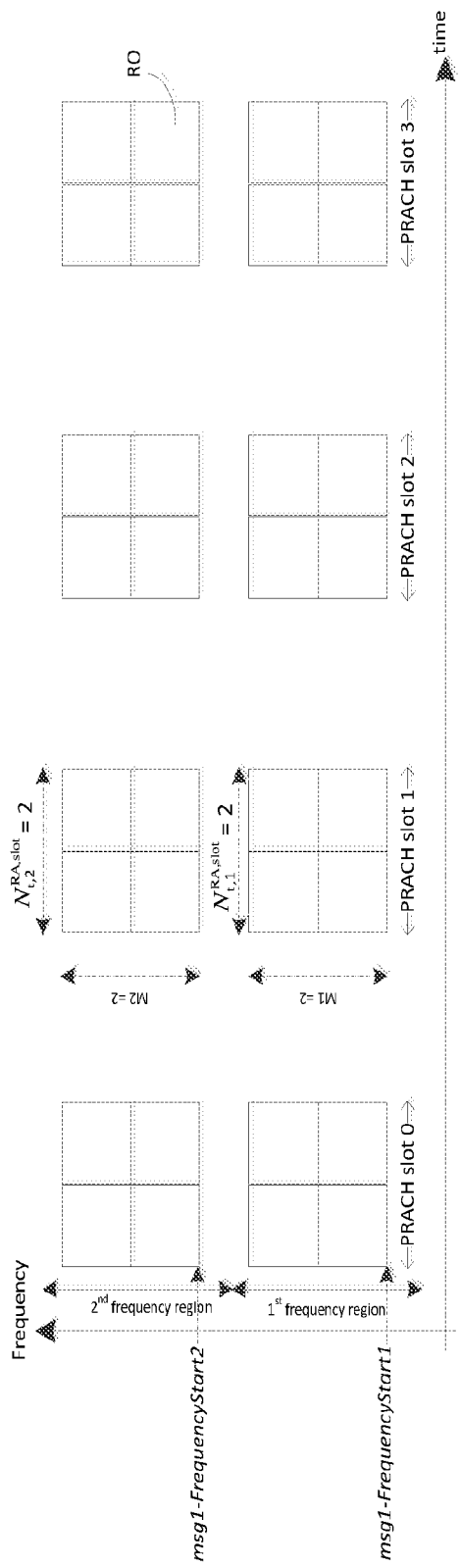
FIG. 5 shows an example of PRACH configuration for maximizing RO availability within a RACH procedure in an unlicensed carrier, in accordance with various embodiments of the present disclosure. As shown in the example, the PRACH is configured per frequency region in the carrier.

FIG. 5 shows an example of PRACH configuration for maximizing RO availability in a RACH procedure in an unlicensed carrier, in accordance with various embodiments of the present disclosure.

As shown in the example, the frequency range of the carrier is divided into more than one frequency regions. There are two frequency regions in the carrier: a first frequency region and a second frequency region shown in FIG. 5.

In the example, each of the more than one frequency regions equal to a LBT sub-band. For example, each of the first frequency region and the second frequency region shown in FIG. 5 has a size of 20 MHz if a LBT sub-band is 20 MHz.

To maximize RO availability, the PRACH is configured per frequency region in a carrier, instead of being configured per carrier. That is, each frequency region configured with the PRACH contains ROs that are corresponding to all the SSBs transmitted from the base station 400. Advantageously, in this manner, even if the terminal 450 encounters a LBT failure in a frequency region which causes ROs corresponding to a selected/detected SSB in that frequency region being not useful, the terminal 450 can still find RO(s) corresponding to the same selected/detected SSB with LBT success in other frequency regions for transmitting PRACH preamble(s).

In addition, in the example, the selected/detected SSB may be transmitted from the base station 400 to the terminal 450 within only one frequency region of the one or more frequency regions. Alternatively, the selected/detected SSB may be transmitted from the base station 400 to the terminal 450 in more than one frequency region of the one or more frequency regions. To maximize RO availability, in either of these two scenarios, the plurality of RO candidates associated with the selected/detected SSB are distributed into multiple of the one or more frequency regions, so that the multiple of the one or more frequency regions contains ROs that are corresponding to the selected/detected SSB.

Advantageously, by virtue of the PRACH configuration for maximizing RO availability as shown in FIG. 5 (as well as FIGS. 6, 7a, 7b, 7c, 7d and 7e), transmission opportunities of MSG1 against LBT failure increase and the RACH procedures can be more efficient.

In the example shown in FIG. 5, the PRACH configuration for each frequency region that is configured with PRACH may include parameters according to higher-layer protocols, such as prach-ConfigurationIndex, msg1-FrequencyStart and msg1-FDM, etc.

In some examples, one or more parameters in the PRACH configuration may be different in the one or more frequency regions. That is, one or more parameters in the PRACH configuration may have a different value for each of the one or more frequency regions. For example, as shown in FIG. 5, the parameter msg1-FrequencyStart, which specifies a starting position of ROs in a frequency domain, may have a different value, e.g. msg1-FrequencyStart1 and msg1-FrequencyStart2, for different frequency regions, e.g. the first frequency region and the second frequency region.

In some examples, one or more parameters in the PRACH configuration may be common in the one or more frequency regions. That is, one or more parameters in the PRACH configuration may have a same value for each of the one or more frequency regions. For example, as shown in FIG. 5, the parameter msg1-FDM which is indicative of the number of ROs that are frequency division multiplexed in one time instant may be the same, e.g. having a value M of 2, in different frequency regions, e.g. the first frequency region and the second frequency region. In addition, the parameter prach-ConfigurationIndex which includes an indication of the number $N_t^{RA,slot}$ of time-division multiplexed ROs within a PRACH slot may be the same, e.g. having a value of 2, in different frequency regions, e.g. the first frequency region and the second frequency region. Advantageously, the one or more parameters that are common in the one or more frequency regions facilitate a single-RACH procedure or a multiple-RACH procedure over multiple frequency regions.

In the example shown in FIG. 5, every frequency region in a carrier (i.e. the first frequency region and the second frequency region) is configured with the PRACH. However, it is appreciable to those skilled in the art that, in some alternative examples, the PRACH may not be configured in every frequency region in a carrier. In other words, it is possible that some of all frequency regions are configured with PRACH.

In these alternative examples, a parameter according to higher-layer protocols may be used to indicate and identity those frequency region(s) that are configured with PRACH among all the frequency regions in a carrier. If only a single frequency region is configured with PRACH, it implies that a single-RACH procedure or a multiple-RACH procedure over multiple frequency regions is disallowed.

Figure 6:
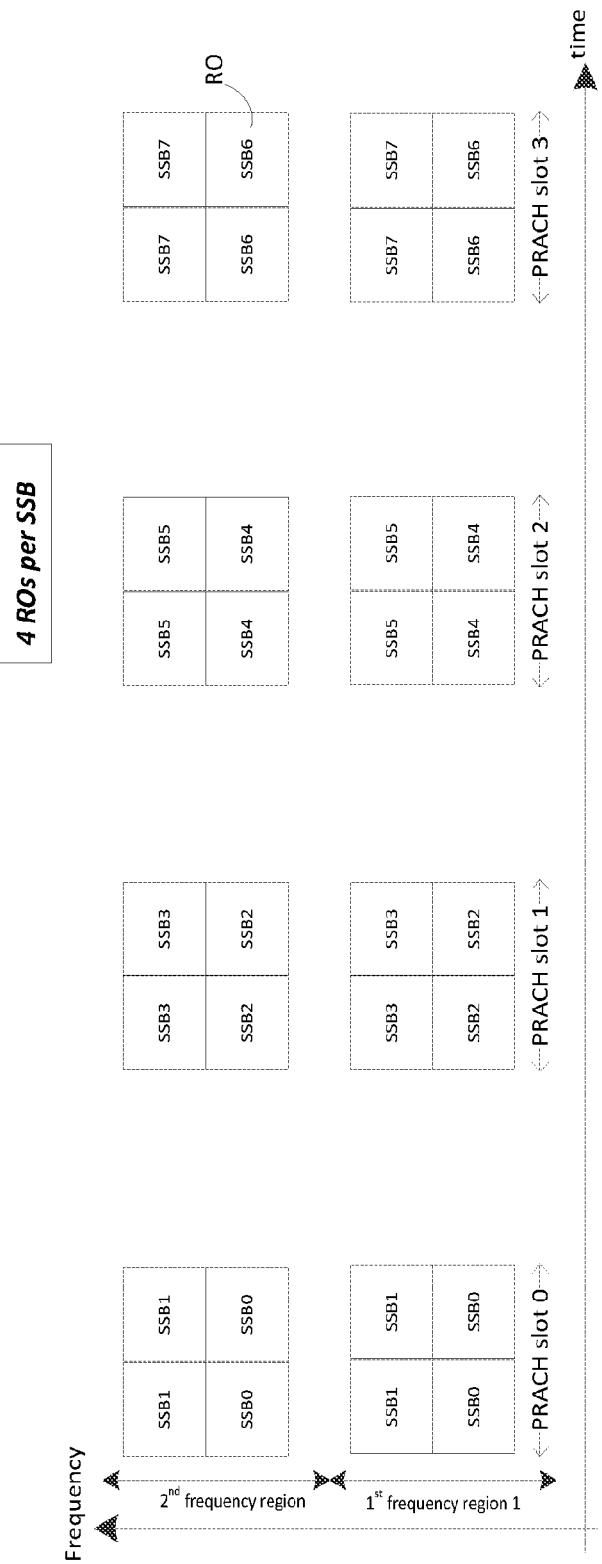
FIG. 6 depicts an embodiment of the PRACH configuration as shown in FIG. 5. In this embodiment of PRACH configuration, a SSB to RO correspondence (which is interchangeably referred to as a SSB to RO mapping or a SSB to RO association) performed respectively for each of the frequency regions that are configured with PRACH.

FIG. 6 depicts an embodiment of the PRACH configuration as shown in FIG. 5. In this embodiment of PRACH configuration, a SSB to RO association (which is interchangeably referred to as a SSB to RO correspondence or a SSB to RO mapping) is performed respectively for each of the one or more frequency regions that are configured with PRACH.

As shown in FIG. 6, to maximize RO availability, the value of the SSB-perRACH-Occasion is set to be smaller than one, e.g. ¼. In this manner, each SSB is mapped to a plurality of ROs, e.g. 4 ROs as exemplified in FIG. 6.

In the embodiment of FIG. 6, a SSB to RO correspondence is performed independently for each of the one or more frequency regions that are configured with PRACH. Within each of the one or more frequency regions, ROs associated with a same SSB are at least time division multiplexed in a PRACH slot and/or distributed across PRACH slots.

By virtue of this SSB to RO correspondence, it is possible for a single-RACH procedure or a multiple-RACH procedure to be performed with multiple LBT procedures in time or frequency domain. In this manner, even if the terminal 450 encounters a LBT failure in a frequency region which causes ROs corresponding to a selected/detected SSB in that frequency region being not useful, the terminal 450 can still find RO(s) corresponding to the same selected/detected SSB with successful LBT(s) in other frequency regions for transmitting PRACH preamble(s).

For example, the terminal 450 can select multiple ROs associated with the detected SSB for a PRACH preamble transmission in a single-RACH procedure or for multiple PRACH preamble transmissions in a multiple-RACH procedure.

In a single-RACH or multiple-RACH procedure, the terminal 450 may select multiple ROs based on the following options:

Option 1: multiple ROs within a same frequency region are selected to enable a single-RACH or multiple-RACH procedure with multiple LBT procedures in time domain.

Option 2: multiple ROs within different frequency regions and corresponding to a same time instant are selected to enable a single-RACH or multiple-RACH procedure with multiple LBT procedures in frequency domain.

Option 3: multiple ROs within different frequency regions and corresponding to different time instants are selected to enable a single-RACH or multiple-RACH procedure with multiple LBT procedures in both time domain and frequency domain.

In the single-RACH procedure, in case of LBT success at one or more frequency regions containing more than one ROs, the terminal 450 will randomly select one RO from the more than one ROs and transmit a PRACH preamble on this RO to the base station 400 to establish the single-RACH procedure. In other words, in the single-RACH procedure, a single PRACH preamble is transmitted.

In the multiple-RACH procedure, in case of LBT success at one or more frequency regions containing more than one ROs, the terminal 450 will randomly select at least two ROs from the more than one ROs and transmit different PRACH preambles at the at least two ROs, which respectively correspond to different RACH procedures in the multiple-RACH procedure.

FIGS. 7*a*, 7*b*, 7*c*, 7*d* and 7*e* each shows an embodiment of the PRACH configuration as shown in FIG. 5. Each of these embodiments corresponds to a SSB to RO correspondence/SSB to RO mapping/SSB to RO association performed over multiple of the frequency regions that are configured with PRACH.

Similar to FIG. 6, to maximize RO availability, the value of the SSB-perRACH-Occasion in the embodiments of FIGS. 7*a*, 7*b*, 7*c*, 7*d* and 7*e* is set to be smaller than one, e.g. ¼. In this manner, each SSB is mapped to a plurality of ROs, e.g. 4 ROs, as exemplified in FIGS. 7*a*, 7*b*, 7*c*, 7*d* and 7*e*.

In the above embodiments, the parameter SSB-perRACH-Occasion may be defined per carrier. In this scenario, the number of ROs associated with a SSB per frequency region is the reciprocal of the value of SSB-per-RACH-Occasion divided by the number of frequency regions configured with PRACH in the carrier.

Alternatively, the parameter SSB-perRACH-Occasion may be defined per frequency region. In this scenario, the number of ROs associated with a SSB per carrier is the reciprocal of the value of SSB-per-RACH-Occasion multiplied by the number of frequency regions configured with PRACH in the carrier.

In the examples shown in FIGS. 7*a*, 7*b*, 7*c*, 7*d* and 7*e*, a SSB to RO correspondence is performed over multiple of the frequency regions that are configured with PRACH in such a manner that ROs associated with a same SSB are at least distributed across the multiple of the frequency regions that are configured with PRACH and across time instances. To distribute the ROs associated with the same SSB across time instances, the ROs may be time division multiplexed in each PRACH slot. Additionally or alternatively, the ROs may be distributed across PRACH slots.

By virtue of the SSB to RO correspondences shown in the PRACH configuration embodiments of FIGS. 7*a*, 7*b*, 7*c*, 7*d* and 7*e*, it is possible for a single-RACH procedure or a multiple-RACH procedure to be performed with multiple LBT procedures in time or frequency domain. Advantageously, in this manner, even if the terminal 450 encounters a LBT failure in a frequency region which causes ROs corresponding to a selected/detected SSB in that frequency region being not useful, the terminal 450 can still find RO(s) corresponding to the same selected/detected SSB with successful LBT(s) in other frequency regions for transmitting PRACH preamble(s).

Figure 7A:
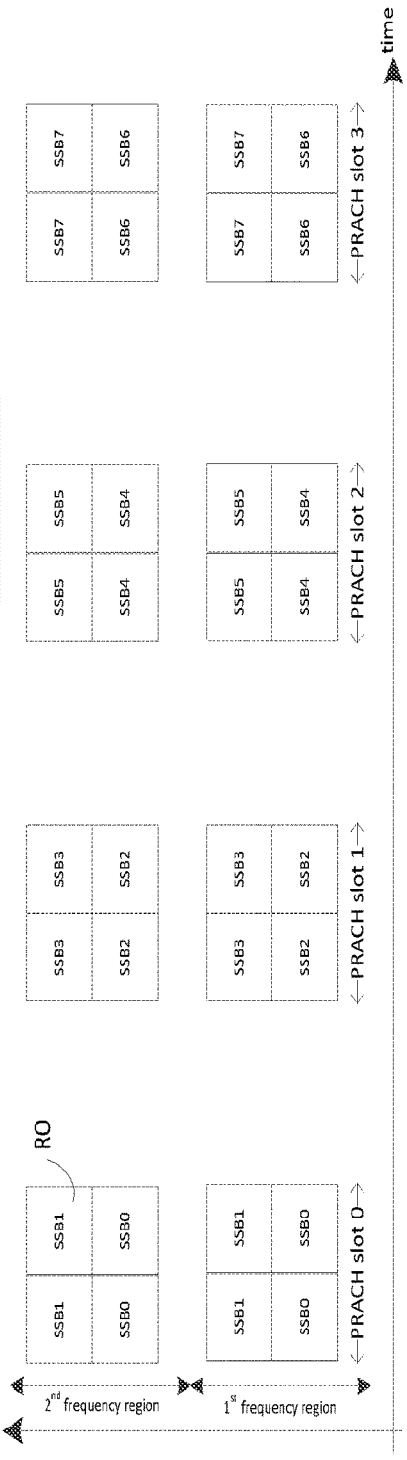
FIG. 7a shows another embodiment of the PRACH configuration as shown in FIG. 5. In this embodiment of PRACH configuration, a SSB to RO correspondence is performed over multiple of the frequency regions that are configured with PRACH.

FIG. 7*a* depicts a first SSB to RO correspondence performed over multiple of the frequency regions that are configured with PRACH. In the example shown in FIG. 7*a*, one SSB is associated with a plurality of ROs, e.g. 4 ROs, as described above. In this example, SSB indexes may be mapped to ROs in the following order:

1) in an increasing order of indexes for frequency regions;
2) in an increasing order of time resource indexes for time division multiplexed ROs within a PRACH slot;
3) in an increasing order of frequency resource indexes for frequency division multiplexed ROs; and
4) in an increasing order of indexes for PRACH slots.

In this example, the order of frequency region indexes and time resource indexes can be swapped.

By virtue of the first SSB to RO correspondence, even if the terminal 450 encounters a LBT failure in a frequency region (e.g. the first frequency region) which causes ROs corresponding to a selected/detected SSB in that frequency region being not useful, the terminal 450 can still find RO(s) corresponding to the same selected/detected SSB with LBT success in other frequency regions (e.g. the second frequency region) for transmitting PRACH preamble(s).

Figure 7B:
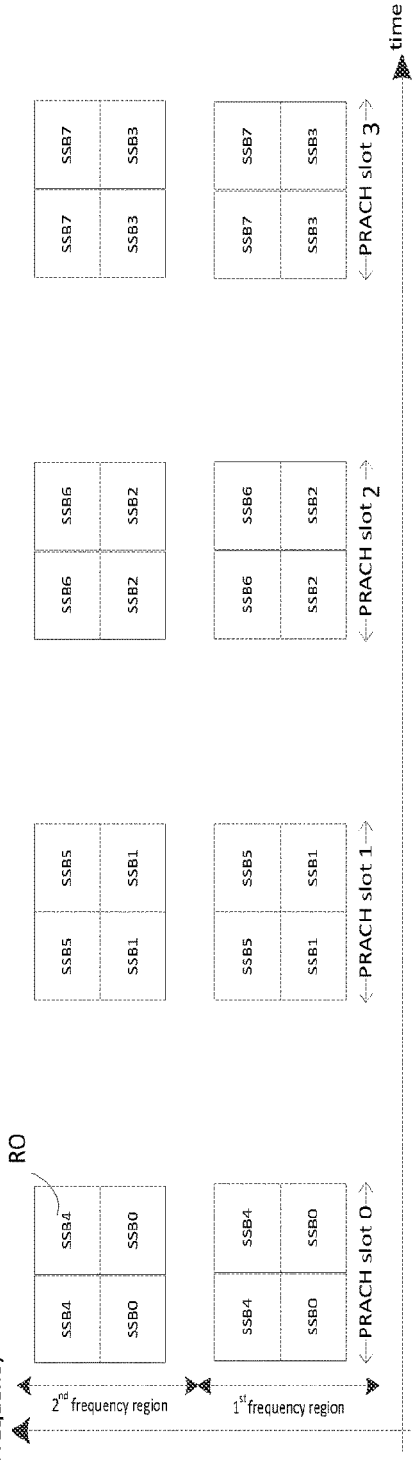
FIG. 7b shows an alternative embodiment of the PRACH configuration as shown in FIG. 7a, in which the SSB to RO correspondence is performed over multiple of the frequency regions in accordance with an alternative rule of SSB to RO correspondence.

FIG. 7*b* depicts a second SSB to RO correspondence performed over multiple of the frequency regions that are configured with PRACH. In the example shown in FIG. 9b, one SSB is associated with a plurality of ROs, e.g. 4 ROs, as described above. In this example, SSB indexes may be mapped to ROs in the following order:
1) in an increasing order of indexes for frequency regions;
2) in an increasing order of time resource indexes for time division multiplexed ROs within a PRACH slot;
3) in an increasing order of indexes for PRACH slots; and
4) in an increasing order of frequency resource indexes for frequency division multiplexed ROs.

In this example, the order of frequency region indexes and time resource indexes can be swapped.

By virtue of the second SSB to RO correspondence, even if the terminal 450 encounters a LBT failure in a frequency region (e.g. the first frequency region) which causes ROs corresponding to a selected/detected SSB in that frequency region being not useful, the terminal 450 can still find RO(s) corresponding to the same selected/detected SSB with LBT success in other frequency regions (e.g. the second frequency region) for transmitting PRACH preamble(s).

Figure 7C:
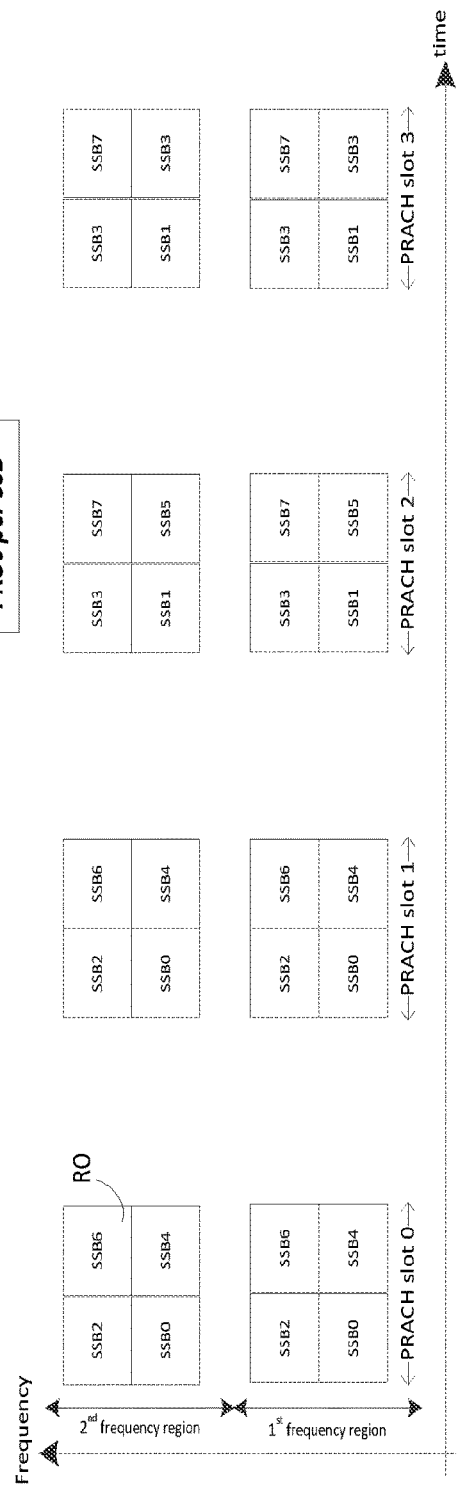
FIG. 7c shows an alternative embodiment of the PRACH configuration as shown in FIGS. 7a and 7b, in which the SSB to RO correspondence is performed over multiple of the frequency regions in accordance with an alternative rule of SSB to RO correspondence.

FIG. 7c depicts a third SSB to RO correspondence performed over multiple of the frequency regions that are configured with PRACH. In the example shown in FIG. 7c, one SSB is associated with a plurality of ROs, e.g. 4 ROs, as described above. In this example, SSB indexes may be mapped to ROs in the following order:
1) in an increasing order of indexes for frequency regions;
2) in an increasing order of indexes for PRACH slots;
3) in an increasing order of frequency resource indexes for frequency division multiplexed ROs; and
4) in an increasing order of time resource indexes for time division multiplexed ROs.

In this example, the order of frequency region index and PRACH slot index can be swapped.

By virtue of the third SSB to RO correspondence, even if the terminal 450 encounters a LBT failure in a frequency region (e.g. the first frequency region) which causes ROs corresponding to a selected/detected SSB in that frequency region being not useful, the terminal 450 can still find RO(s) corresponding to the same selected/detected SSB with LBT success in other frequency regions (e.g. the second frequency region) for transmitting PRACH preamble(s).

In addition, by virtue of the third SSB to RO correspondence, even if the terminal 450 encounters a LBT failure in a PRACH slot, it may have better chance to find ROs corresponding to the SSB which is mapped to the PRACH slot in other PRACH slots.

Figure 7D:
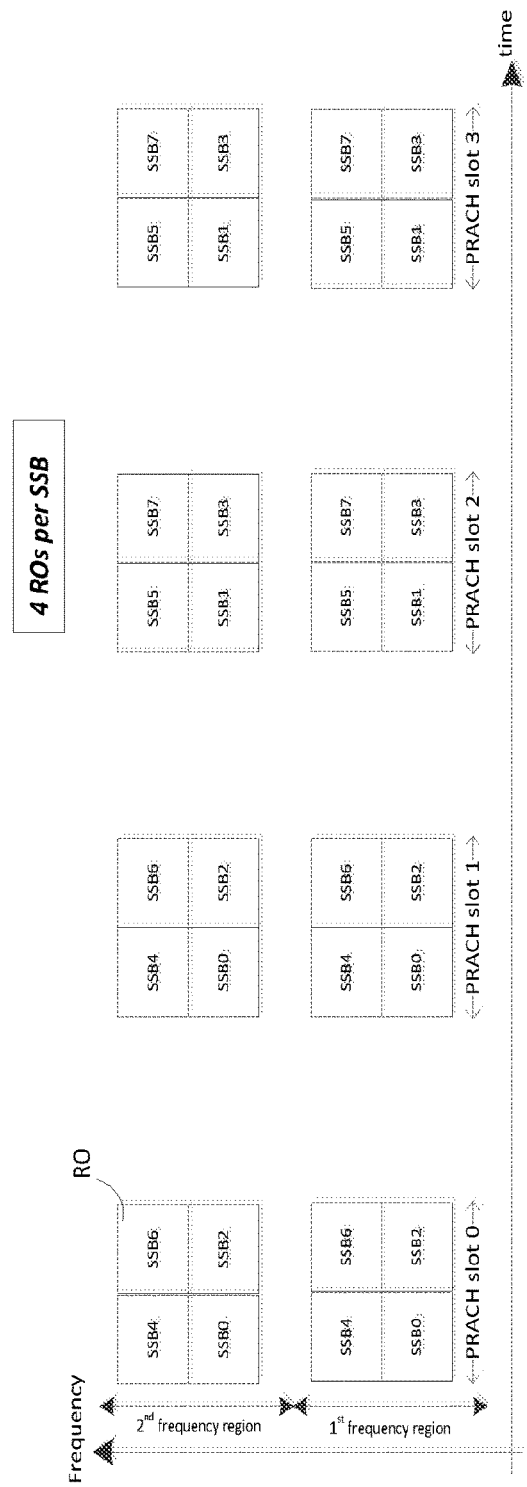
FIG. 7d shows an alternative embodiment of the PRACH configuration as shown in FIGS. 7a, 7b and 7c, in which the SSB to RO correspondence is performed over multiple of the frequency regions in accordance with an alternative rule of SSB to RO correspondence.

FIG. 7d depicts a fourth SSB to RO correspondence performed over multiple of the frequency regions that are configured with PRACH. In the example shown in FIG. 7d, one SSB is associated with a plurality of ROs, e.g. 4 ROs, as described above. In this example, SSB indexes may be mapped to ROs in the following order:
1) in an increasing order of indexes for frequency regions.
2) in an increasing order of indexes for PRACH slots.
3) in an increasing order of time resource indexes for time division multiplexed ROs.
4) in an increasing order of frequency resource indexes for frequency division multiplexed ROs.

In this example, the order of frequency region index and PRACH slot index can be swapped.

By virtue of the four SSB to RO correspondence, even if the terminal 450 encounters a LBT failure in a frequency region (e.g. the first frequency region) which causes ROs corresponding to a selected/detected SSB in that frequency region being not useful, the terminal 450 can still find RO(s) corresponding to the same selected/detected SSB with LBT success in other frequency regions (e.g. the second frequency region) for transmitting PRACH preamble(s).

In addition, by virtue of the four SSB to RO correspondence, even if the terminal 450 encounters a LBT failure in a PRACH slot, it may have better chance to find ROs corresponding to the SSB which is mapped to the PRACH slot in other PRACH slots.

Figure 7E:
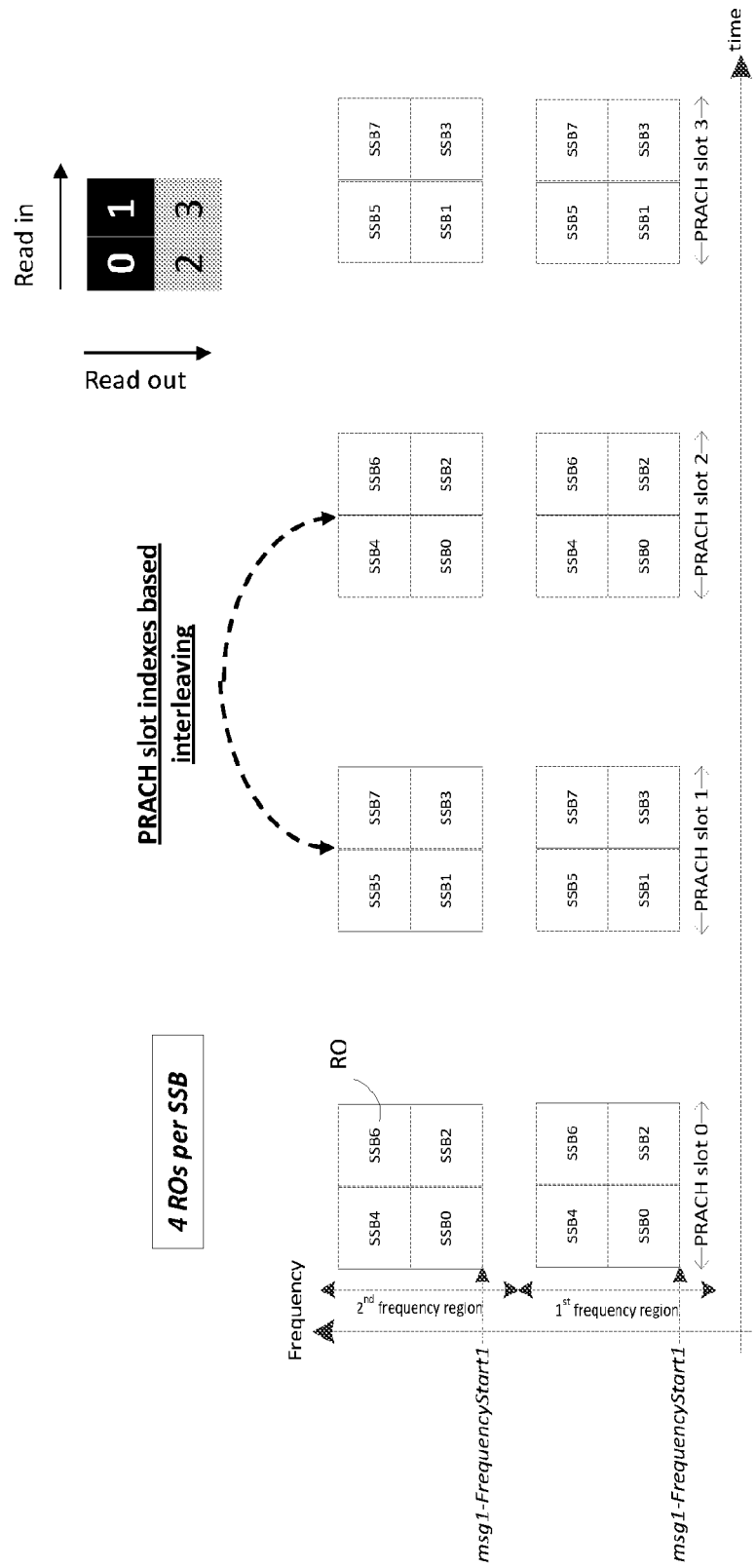
FIG. 7e shows yet another embodiment of the PRACH configuration as shown in FIGS. 7a, 7b, 7c and 7d, in which the SSB to RO correspondence is performed over multiple of the frequency regions in accordance with yet another rule of SSB to RO correspondence.

FIG. 7e depicts a fifth SSB to RO correspondence performed over multiple of the frequency regions that are configured with PRACH. In the example shown in FIG. 7e, one SSB is associated with a plurality of ROs, e.g. 4 ROs, as described above, and an interleaving operation is applied to PRACH slot indexes on top of the first to fourth SSB to RO correspondence as shown in FIGS. 7a to 7d.

By virtue of the fifth SSB to RO correspondence, even if the terminal 450 encounters a LBT failure in a frequency region (e.g. the first frequency region) which causes ROs corresponding to a selected/detected SSB in that frequency region being not useful, the terminal 450 can still find RO(s) corresponding to the same selected/detected SSB with LBT success in other frequency regions (e.g. the second frequency region) for transmitting PRACH preamble(s).

In addition, by virtue of the fifth SSB to RO correspondence, even if the terminal 450 encounters a LBT failure in two or more consecutive PRACH slots, the terminal 450 may have better chance to find ROs corresponding to the SSBs which are mapped to the two or more consecutive PRACH slots in other PRACH slots.

The third, fourth or fifth SSB to RO correspondence are advantageous in cases where a NR stand-alone system operating in unlicensed bands (e.g., 5 GHz or 6 GHz unlicensed bands) coexists with a Wi-Fi network in which a physical layer protocol data unit (PPDU) duration may be longer than one or more PRACH slot.

In view of the above five SSB to RO correspondences, more than one SSB to RO correspondence among the five SSB to RO correspondences can be used in a process of establishing a single-RACH or multiple-RACH procedure between the base station 400 and the terminal 450, according to various embodiments of the present disclosure.

Examples of the above single-RACH procedure and multiple-RACH procedure in accordance with the PRACH configuration described in FIGS. 5, 6, 7a, 7b, 7c, 7d and 7e may be described with reference to FIGS. 4a and 4b.

In some embodiments, the at least one transmission signal generator 456 of the terminal 450, when in operation, generates a first PRACH preamble. The at least one radio transmitter 452 of the terminal 450, when in operation, transmits the first PRACH preamble to the base station 400 on a first RO among a plurality of RO candidates. The plurality of RO candidates can be determined by the at least one controller 460 of the terminal 450 based on PRACH configuration information received from the base station 400. The first RO is assigned within a first frequency region that is equal to a first sub-band in which a LBT procedure is performed at the terminal 450. In other words, the first frequency region has a size that is equal to the size of the first LBT sub-band. For example, the first frequency region has a size of 20 MHz if the first LBT sub-band is 20 MHz.

As described above, in a single-RACH procedure, the terminal 450 can select multiple ROs among the plurality of RO candidates for a PRACH preamble transmission. Similarly, in a multiple-RACH procedure, the terminal 450 can select multiple ROs among the plurality of RO candidates for multiple PRACH preamble transmissions. The plurality of RO candidates are associated with a SSB that the terminal 450 selects/detects among SSBs received from the base station 400.

Therefore, in some examples, the terminal 450 needs to select multiple ROs among the plurality of RO candidates for a single-RACH procedure or a multiple-RACH procedure.

In these examples, the at least one transmission signal generator 456 of the terminal 450, when in operation, may further generate a second PRACH preamble. In these embodiments, the at least one radio transmitter 452 of the terminal 450, when in operation, transmits the second PRACH preamble to the base station on a second RO among the plurality of RO candidates. The second RO is assigned within a second frequency region that is equal to a second sub-band in which a LBT procedure is performed at the terminal 450. In other words, the second frequency region has a size that is equal to the second LBT sub-band. For example, the second frequency region has a size of 20 MHz if the second LBT sub-band is 20 MHz.

It is appreciable to those skilled in the art that, based on practical needs and network configurations, the at least one transmission signal generator 456 of the terminal 450, when in operation, may further generate more PRACH preambles to be transmitted by the at least one radio transmitter 452 of the terminal 450 on more ROs. The more ROs may be assigned within other frequency regions or the first and/or second frequency regions.

As described above, in the single-RACH procedure, in case of LBT success at one or more frequency regions containing more than one ROs, the at least one controller 456 of the terminal 450 may randomly select one RO from the more than one ROs and transmit a PRACH preamble on this RO to the base station 400. In other words, in the single-RACH procedure, a single PRACH preamble is transmitted.

Similarly, in the multiple-RACH procedure, in case of LBT success at one or more frequency regions containing more than one ROs, the at least one controller 456 of the terminal 450 may randomly select at least two ROs from the more than one ROs and transmit different PRACH preambles on the at least two ROs to the base station 400 in different RACH procedures of the multiple-RACH procedure. The terminal 450 may generate the first PRACH preamble and the second PRACH preamble based on a same sequence or different sequences. When a same sequence is used to generate the first PRACH preamble and the second PRACH preamble, different cyclic shifts are applied to the same sequence.

In some embodiments, the PRACH configuration information received by the at least one radio receiver 454 of the terminal 450 from the base station 400 may include a parameter that identifies frequency regions that are configured for the PRACH. In some examples, the parameter identifies the first frequency region and the second frequency region that are configured for the PRACH. However, it is possible that not every frequency region in a carrier is configured with PRACH. Therefore, in some alternative examples, the parameter may identify some frequency regions among all frequency regions in a carrier as being configured with PRACH. For example, the parameter may be a bitmap whose size is the number of frequency regions in the carrier. Each bit of the bitmap indicates whether the corresponding frequency region is configured with PRACH.

In some embodiments, the PRACH configuration information received by the at least one radio receiver 454 of the terminal 450 from the base station 400 may include one or more parameters that are common in the first frequency region and the second frequency region. That is, one or more parameters in the PRACH configuration may have a same value for each of the first frequency region and the second frequency region. For example, the one or more parameters are indicative of the number of ROs that are frequency division multiplexed in one time instant in the first frequency region and the second frequency region, as described with respect to FIG. 5.

In some embodiments, the PRACH configuration information received by the at least one radio receiver 454 of the terminal 450 from the base station 400 may include one or more parameters in the PRACH configuration that are different in the first frequency region and the second frequency region. That is, one or more parameters in the PRACH configuration may have a different value for each of the first frequency region and the second frequency region. For example, the one or more parameters are indicative of a starting position of ROs in frequency domain in the first frequency region or the second frequency region, as described with respect to FIG. 5.

As described above, the plurality of RO candidates are associated with a SSB that the terminal 450 selects/detects among SSBs received from the base station 400. In some embodiments, the selected/detected SSB may be transmitted from the base station 400 to the terminal 450 within one frequency region of the first frequency region and the second frequency region. Alternatively, the selected/detected SSB may be transmitted from the base station 400 to the terminal 450 in both the first frequency region and the second frequency region. To maximize RO availability, in either of these two scenarios, the plurality of RO candidates associated with the selected/detected SSB are distributed into each of the first frequency region and the second frequency region, so that each of the first frequency region and the second frequency region contains ROs that are corresponding to the selected/detected SSB.

In some examples, the plurality of RO candidates are determined based on a SSB to RO correspondence for the first frequency region or the second frequency region, as described with respect to FIG. 6.

In some examples, the plurality of RO candidates are determined based on a SSB to RO correspondence for the first frequency region and the second frequency region, as described with respect to FIGS. 7a, 7b, 7c, 7d, and 7e. In these examples, the plurality of RO candidates associated with the SSB are distributed across the first frequency region and the second frequency region, and distributed across time instants.

Figure 8:
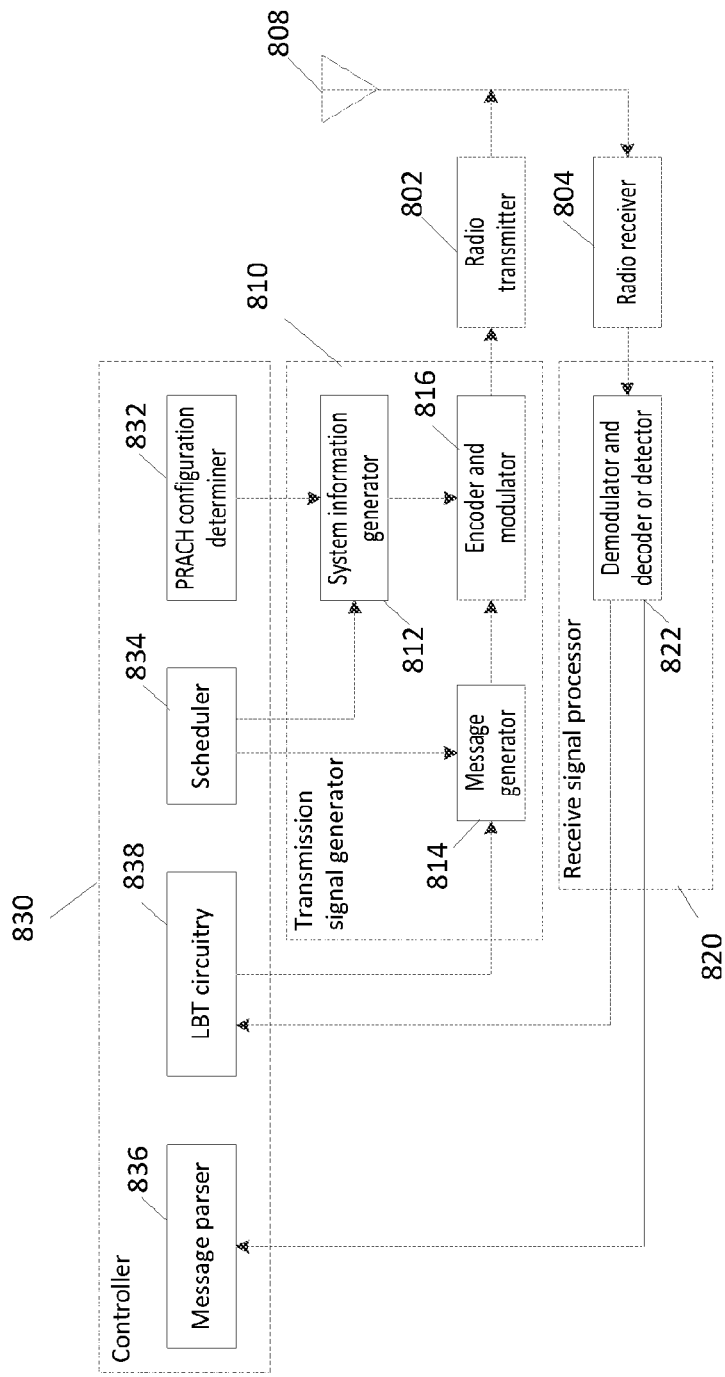
FIG. 8 shows another schematic example of base station that can be implemented to establish a RACH procedure in an unlicensed carrier in accordance with various embodiments as shown in FIGS. 5 to 7e.

FIG. 8 shows another schematic example of base station that can be implemented to establish a RACH procedure in an unlicensed carrier in accordance with various embodiments as shown in FIGS. 5 to 7e.

In the schematic example of FIG. 8, the at least one controller 830 of the base station may at least include a PRACH configuration determiner 832, a scheduler 834, a message parser 836 and a LBT circuitry 838. The PRACH configuration determiner 832 when in operation is configured to determine PRACH configuration in the carrier. The scheduler 834 when in operation is configured to schedule transmissions of higher-layer messages (e.g. MSG2, MSG4) and system information, such as RMSI, etc, to terminals. The scheduler 834 when in operation is also configured to generate uplink grants for transmissions of higher-layer messages (e.g. MSG3) for the terminals. The message parser 836 when in operation is configured to analyse the received PRACH preamble and higher-layer messages (e.g. MSG3)

from the terminals. The LBT circuitry 838 when in operation is configured to perform LBT procedures, for example, at each frequency region/sub-band in the carrier.

In the schematic example of FIG. 8, the at least one transmission signal generator 810 may include at least a system information generator 812, a message generator 814, an encoder and modulator 816. The at least one receive signal processor 820 may include at least a demodulator and a decoder or detector 822.

The system information generator 812 when in operation is configured to generate system information such as RMSI based on the results from the PRACH configuration determiner 832 and the scheduler 834.

Based on the LBT results provided by the LBT circuitry 838, the message generator 814 when in operation is configured to generate higher-layer messages, e.g. random access response messages (MSG2s) in response to receipts of PRACH preamble from the terminal or contention resolution messages (MSG4s) in response to receipts of scheduled transmission messages (MSG3s) from the terminal.

The encoder and modulator 816 when in operation is configured to encode and modulate the generated system information received from the system information generator 812 or higher-layer messages received from the message generator 814.

The demodulator and decoder or detector 822 when in operation is configured to detect the PRACH preambles (MSG1s) received from the terminals, or demodulate and decode higher-layer messages (e.g. MSG3s) received from the terminals, or sense the LBT sub-bands in the carrier.

Figure 9:
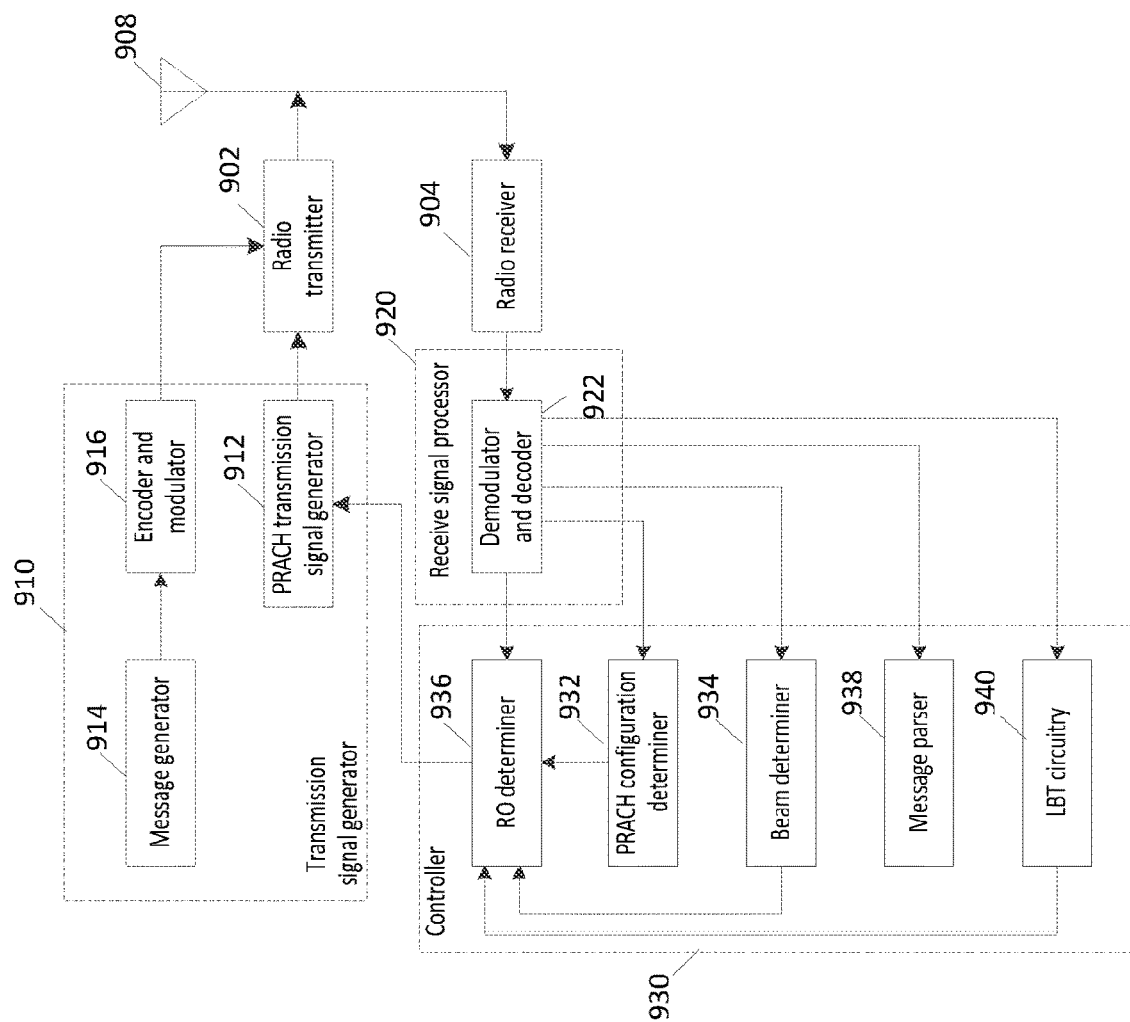
FIG. 9 shows another schematic example of terminal that can be implemented to establish a RACH procedure in an unlicensed carrier in accordance with various embodiments as shown in FIGS. 5 to 7e.

FIG. 9 shows another schematic example of terminal that can be implemented to establish a RACH procedure in an unlicensed carrier in accordance with various embodiments as shown in FIGS. 5 to 7e.

In the schematic example of FIG. 9, the at least one controller 930 of the terminal may at least include a PRACH configuration determiner 932, a beam determiner 934, a RO determiner 936, a message parser 938 and a LBT circuitry 940. The PRACH configuration determiner 932 when in operation is configured to determine the PRACH configuration information based on system information received from the base station. The beam determiner 934 when in operation is configured to determine a best beam/SSB or a beam/SSB with a quality that is good enough from SSBs transmitted from the base station. Based on the LBT results provided by the LBT circuitry 940, the RO determiner 936 when in operation is configured to determine/select one or more ROs among a plurality of RO candidates corresponding to the SSB selected by the beam determiner 934. The message parser 938 when in operation is configured to analyse the received higher-layer messages (e.g. MSG2, MSG4) from the base station. The LBT circuitry 940 when in operation is configured to perform LBT procedures, for example, on each frequency region/sub-band with PRACH configured in the carrier.

In the schematic example of FIG. 9, the transmission signal generator 910 may include at least a PRACH transmission signal generator 912, a message generator 914, an encoder and modulator 916 and the receive signal processor 920 may include at least a demodulator and a decoder 922.

The demodulator and decoder 922 when in operation is configured to demodulate and decode the received signal (e.g., system information or higher-layer messages) received from the base station or sense LBT sub-bands in the carrier via the at least one radio receiver 904 of the terminal. The decoded system information or higher-layer messages are provided to the PRACH configuration determiner 932, the beam determiner 934, the RO determiner 936 and the message parser 938 to perform their respective functions.

The PRACH transmission signal generator 912 when in operation is configured to generate PRACH preamble signal at the one or more ROs determined/selected by the RO determiner 936 in the controller 930.

The message generator 914 when in operation is configured to generate higher-layer messages (e.g. MSG3s).

The encoder and modulator 916 when in operation is configured to encode and modulate the generated higher-layer messages (e.g. MSG3s) received from the message generator 914 for transmission to the base station by the at least one radio transmitter 902 of the terminal.

As described above, the embodiments of the present disclosure provide an advanced communication system, communication methods and communication apparatuses that enables a more efficient RACH procedure with enhanced transmission opportunities of MSG1 against LBT failures in an unlicensed carrier.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to a communication apparatus.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

According to the present disclosure, there is provided various features such as:

1. A terminal comprising:
circuitry which, in operation, generates a first random access preamble; and
a transmitter which, in operation, transmits the first random access preamble to a base station on a first physical random access channel (PRACH) occasion (RO) among a plurality of RO candidates, the plurality of RO candidates being determined based on PRACH configuration information received from the base station,
wherein the first RO is assigned within a first frequency region, the first frequency region being equal to a first sub-band in which a listen before talk (LBT) procedure is performed at the terminal.

2. The terminal according to statement 1, wherein
the circuitry, in operation, generates a second random access preamble; and
the transmitter, in operation, transmits the second random access preamble to the base station on a second RO among the plurality of RO candidates,
wherein the second RO is assigned within a second frequency region, the second frequency region being equal to a second sub-band in which a LBT procedure is performed at the terminal.

3. The terminal according to statement 2, wherein the first random access preamble and the second random access preamble are generated from a same sequence.

4. The terminal according to statement 2, wherein the first frequency region is same as the second frequency region.

5. The terminal according to statement 2, wherein the first frequency region is different from the second frequency region.

6. The terminal according to statement 2, comprising a receiver which, in operation, receives a parameter included in the PRACH configuration information, the parameter identifying the first frequency region and the second frequency region that are configured for the PRACH.

7. The terminal according to statement 2, comprising a receiver which, in operation, receives one or more parameters included in the PRACH configuration information, the one or more parameters being common in the first frequency region and the second frequency region.

8. The terminal according to statement 7, wherein the one or more parameters are indicative of the number of ROs that are frequency domain multiplexed in one time instance in the first frequency region and the second frequency region.

9. The terminal according to statement 2, comprising a receiver which, in operation, receives one or more parameters included in the PRACH configuration information, the one or more parameters being different between the first frequency region and the second frequency region.

10. The terminal according to statement 9, wherein the one or more parameters are indicative of a starting position of ROs in frequency domain in the first frequency region or the second frequency region.

11. The terminal according to statement 1, wherein the plurality of RO candidates are associated with a synchronization signal block (SSB) received from the base station.

12. The terminal according to statement 11, wherein the plurality of RO candidates are determined based on a SSB to RO correspondence for the first frequency region or the second frequency region.

13. The terminal according to statement 11, wherein the plurality of ROs candidates are determined based on a SSB to RO correspondence for the first frequency region and the second frequency region, wherein the plurality of RO candidates associated with the SSB are:
distributed across the first frequency region and the second frequency region, and
distributed across time instances.

14. The terminal according to statement 2, wherein the plurality of RO candidates are associated with a SSB transmitted in the first frequency region or the second frequency region.

15. A base station comprising:
circuitry which, in operation, determines PRACH configuration, the PRACH configuration including a plurality of RO candidates; and
a receiver which, in operation, receives a first random access preamble from a terminal on a first RO among the plurality of RO candidates,
wherein the first RO is assigned within a first frequency region, the first frequency region being equal to a first sub-band in which a LBT procedure is performed at the terminal.

16. The base station according to statement 15, wherein
the receiver, in operation, receives a second random access preamble from the terminal on a second RO among the plurality of RO candidates, and wherein the second RO is assigned within a second frequency region, the second frequency region being equal to a second sub-band in which a LBT procedure is performed at the terminal.

17. The base station according to statement 16, wherein the first random access preamble and the second random access preamble are generated from a same sequence.

18. The base station according to statement 16, wherein the first frequency region is same as the second frequency region.

19. The base station according to statement 16, wherein the first frequency region is different from the second frequency region.

20. The base station according to statement 16, wherein the transmitter, in operation, transmits a parameter included in the PRACH configuration information, the parameter identifying the first frequency region and the second frequency region that are configured for the PRACH.

21. The base station according to statement 16, wherein the transmitter, in operation, transmits one or more parameters in PRACH configuration information, the one or more parameters being common in the first frequency region and the second frequency region.

22. The base station according to statement 21, wherein the one or more parameters are indicative of the number of ROs that are frequency domain multiplexed in one time instance in the first frequency region and the second frequency region.

23. The base station according to statement 16, wherein the transmitter, in operation, transmits one or more parameters in PRACH configuration information, the one or more parameters being different between the first frequency region and the second frequency region.

24. The base station according to statement 23, wherein the one or more parameters are indicative of a starting position of ROs in frequency domain in the first frequency region or the second frequency region.

25. The base station according to statement 15, wherein the plurality of RO candidates are associated with a SSB transmitted to the terminal.

26. The base station according to statement 25, comprising a controller which, in operation, arranges the plurality of RO candidates based on a SSB to RO correspondence for the first frequency region or the second frequency region.

27. The base station according to statement 25, comprising a controller which, in operation, arranges the plurality of RO candidates based on a SSB to RO correspondence for the first frequency region and the second frequency region, wherein the plurality of RO candidates associated with the SSB are:
  distributed across the first frequency region and the second frequency region, and
  distributed across time instances.

28. The base station according to statement 11, wherein the plurality of RO candidates are associated with a SSB transmitted in the first frequency region or the second frequency region.

29. A communication method comprising:
  generating, at a terminal, a first random access preamble; and
  transmitting, from the terminal, the first random access preamble to a base station on a first RO among a plurality of RO candidates, the plurality of RO candidates being determined based on PRACH configuration information received from the base station
  wherein the first RO is assigned within a first frequency region, the first frequency region being equal to a first sub-band in which a LBT procedure is performed at the terminal.

30. A communication method comprising:
  determining, at a base station, PRACH configuration, the PRACH configuration including a plurality of RO candidates; and
  receiving, at the base station, a first random access preamble on a first RO among the plurality of RO candidates,
  wherein the first RO is assigned within a first frequency region, the first frequency region being equal to a sub-band in which a LBT procedure is performed at the terminal.

The invention claimed is:
1. A communication apparatus, comprising:
  a receiver, which, in operation, receives from a base station a synchronization signal block (SSB), and receives from the base station physical random access channel (PRACH) configuration information; and
  a transmitter, which is coupled to the receiver and which, in operation, transmits a first random access preamble to the base station on a first physical random access channel occasion (RO) or a second RO among a plurality of RO candidates corresponding to a SSB index of the received SSB;
  wherein the plurality of RO candidates corresponding to the SSB index are assigned within a plurality of frequency regions according to an assignment pattern based on the PRACH configuration information, wherein, in a same time, the first RO among the plurality of RO candidates is assigned within a first frequency region and the second RO among the plurality of RO candidates is assigned within a second frequency region, which is different from the first frequency region along a frequency axis,
  wherein the PRACH configuration information includes prach-ConfigurationIndex which indicates PRACH time resources used for both the first RO and the second RO corresponding to the SSB index, and
  wherein the plurality of RO candidates associated with a same SSB index are assigned in an order of the first frequency region and the second frequency region in a first time instance, and are assigned in the order of the first frequency region and the second frequency region in a second time instance.

2. The communication apparatus according to claim 1, wherein each of the plurality of frequency regions is 20 MHz.

3. The communication apparatus according to claim 1, wherein each of the plurality of frequency regions equals a sub-band in which a listen before talk (LBT) procedure is performed at the communication apparatus.

4. The communication apparatus according to claim 1, wherein a second random access preamble is transmitted to the base station on a third RO among another plurality of RO candidates corresponding to another SSB index.

5. The communication apparatus according to claim 1, wherein SSB indices including the SSB index are related to the plurality of RO candidates in the following order of: frequency resource indices, time resource indices, and indices of physical random access channel (PRACH) slots.

6. The communication apparatus according to claim 1, wherein the first RO and the second RO corresponding to the SSB index are assigned to two frequency positions that are inconsecutive along the frequent axis.

7. The communication apparatus according to claim 1, wherein the physical random access channel (PRACH) configuration information includes the prach-ConfigurationIndex, msg1-FrequencyStart, and/or msg1-FDM.

8. The communication apparatus according to claim 1, wherein an interval between a starting position of the first frequency region and a starting position of the second frequency region is 20 MHz or more.

9. The communication apparatus according to claim 1, wherein the PRACH configuration information includes msg1-FDM, which indicates a number of ROs multiplexed in the first frequency region and in the second frequency region.

10. The communication apparatus according to claim 1, wherein each of the first frequency region and the second frequency region in the first time instance includes one RO candidate associated with a same SSB index.

11. A communication method performed by a communication apparatus, the communication method comprising:

receiving from a base station a synchronization signal block (SSB);

receiving from the base station physical random access channel (PRACH) configuration information;

generating a first random access preamble; and transmitting the first random access preamble to the base station on a first physical random access channel occasion (RO) or a second RO among a plurality of RO candidates corresponding to a SSB index of the received SSB;

wherein the plurality of RO candidates corresponding to the SSB index are assigned within a plurality of frequency regions according to an assignment pattern based on the PRACH configuration information, wherein, in a same time, the first RO among the plurality of RO candidates is assigned within a first frequency region and the second RO among the plurality of RO candidates is assigned within a second frequency region, which is different from the first frequency region along a frequency axis, wherein the PRACH configuration information includes prach-ConfigurationIndex which indicates PRACH time resources used for both the first RO and the second RO corresponding to the SSB index, and wherein the plurality of RO candidates associated with a same SSB index are assigned in an order of the first frequency region and the second frequency region in a first time instance, and are assigned in the order of the first frequency region and the second frequency region in a second time instance.

12. The communication method according to claim 11, wherein each of the plurality of frequency regions is 20 MHz.

13. The communication method according to claim 11, wherein each of the plurality of frequency regions equals a sub-band in which a listen before talk (LBT) procedure is performed at the communication apparatus.

14. The communication method according to claim 11, wherein a second random access preamble is transmitted to the base station on a third RO among another plurality of RO candidates corresponding to another SSB index.

15. The communication method according to claim 11, wherein SSB indices including the SSB index are related to the plurality of RO candidates in the following order of: frequency resource indices, time resource indices, and indices of physical random access channel (PRACH) slots.

16. The communication method according to claim 11, wherein the first RO and the second RO corresponding to the SSB index are assigned to two frequency positions that are inconsecutive along the frequent axis.

17. The communication method according to claim 11, wherein the physical random access channel (PRACH) configuration information includes the prach-Configuration-Index, msg1-FrequencyStart, and/or msg1-FDM.

18. The communication method according to claim 11, wherein an interval between a starting position of the first frequency region and a starting position of the second frequency region is 20 MHz or more.

19. The communication method according to claim 11, wherein the PRACH configuration information includes msg1-FDM, which indicates a number of ROs multiplexed in the first frequency region and in the second frequency region.

20. The communication method according to claim 11, wherein each of the first frequency region and the second frequency region in the first time instance includes one RO candidate associated with a same SSB index.

* * * * *